US011115156B2

(12) United States Patent
Wei et al.

(10) Patent No.: US 11,115,156 B2
(45) Date of Patent: Sep. 7, 2021

(54) DISCONTINUOUS RECEPTION OPERATIONS AMONG MULTIPLE BANDWIDTH PARTS

(71) Applicant: FG Innovation IP Company Limited, Tuen Mun (CN)

(72) Inventors: Chia-Hung Wei, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/198,837

(22) Filed: Nov. 22, 2018

(65) Prior Publication Data
US 2019/0158229 A1 May 23, 2019

Related U.S. Application Data

(60) Provisional application No. 62/589,628, filed on Nov. 22, 2017.

(51) Int. Cl.
*H04L 1/18* (2006.01)
*H04W 72/04* (2009.01)
*H04W 76/28* (2018.01)

(52) U.S. Cl.
CPC .......... *H04L 1/1812* (2013.01); *H04L 1/1848* (2013.01); *H04W 72/0446* (2013.01); *H04W 76/28* (2018.02)

(58) Field of Classification Search
CPC .................................................. H04L 1/1812
See application file for complete search history.

(56) References Cited

U.S. PATENT DOCUMENTS 10,334,581 B2 * 6/2019 Dinan ..................... H04L 27/26
10,721,025 B2 * 7/2020 Jeon ...................... H04L 5/0053
(Continued)

FOREIGN PATENT DOCUMENTS

WO 2014/181997 A1 11/2014

OTHER PUBLICATIONS

LG Electronics Inc. Consideration on HARQ RTT Timer. 3GPP TSG-RAN2 Meeting #99bis, R2-1710755. Sep. 29, 2017 (Sep. 29, 2017) sections 2-5.
(Continued)

*Primary Examiner* — Parth Patel
(74) *Attorney, Agent, or Firm* — ScienBiziP, P.C.

(57) ABSTRACT

A user equipment (UE) for discontinuous reception (DRX) operation having a Downlink DRX Hybrid Automatic Repeat reQuest (HARQ) Round-Trip Time Timer (drx-HARQ-RTT-TimerDL) is disclosed. The UE comprises one or more non-transitory computer-readable media having computer-executable instructions embodied thereon; at least one processor coupled to the one or more non-transitory computer-readable media, and configured to execute the computer-executable instructions to perform the DRX operation, wherein the DRX operation comprises: starting the drx-HARQ-RTT-TimerDL from an initial value in a first symbol after an end of a corresponding transmission carrying a DL HARQ feedback, the DL HARQ feedback corresponding to downlink data. The initial value is represented in number of symbols of a BWP (bandwidth part) where the downlink data is received.

8 Claims, 13 Drawing Sheets

(56) References Cited

U.S. PATENT DOCUMENTS

| | | | |
|---|---|---|---|
| 10,763,947 B2* | 9/2020 | Kim | H04W 72/04 |
| 2009/0052367 A1 | 2/2009 | Cai et al. | |
| 2017/0195028 A1* | 7/2017 | Shimezawa | H04L 69/22 |
| 2017/0373803 A1* | 12/2017 | Wu | H04W 72/04 |
| 2018/0176982 A1* | 6/2018 | Yu | H04W 76/28 |
| 2018/0279229 A1* | 9/2018 | Dinan | H04W 52/146 |
| 2018/0332608 A1* | 11/2018 | Guo | H04W 72/1289 |
| 2018/0367255 A1* | 12/2018 | Jeon | H04L 5/0053 |
| 2018/0368175 A1* | 12/2018 | Jeon | H04W 72/04 |
| 2018/0375623 A1* | 12/2018 | Suzuki | H04L 1/1883 |
| 2019/0037637 A1* | 1/2019 | Suzuki | H04W 72/04 |
| 2019/0045550 A1* | 2/2019 | Jang | H04L 1/1812 |
| 2019/0052413 A1* | 2/2019 | Babaei | H04L 1/1848 |
| 2019/0052416 A1* | 2/2019 | Babaei | H04L 1/1854 |
| 2019/0053159 A1* | 2/2019 | Wei | H04W 52/0225 |
| 2019/0098689 A1* | 3/2019 | Wei | H04W 76/28 |
| 2019/0149308 A1* | 5/2019 | Son | H04L 5/0092 375/260 |
| 2019/0158229 A1* | 5/2019 | Wei | H04L 1/1848 |
| 2019/0199503 A1* | 6/2019 | Son | H04L 5/0053 |
| 2019/0364602 A1* | 11/2019 | Yi | H04W 74/0833 |
| 2019/0380112 A1* | 12/2019 | Lee | H04L 1/1887 |
| 2020/0052830 A1* | 2/2020 | Liu | H04L 5/14 |
| 2020/0128607 A1* | 4/2020 | Tang | H04W 52/0235 |
| 2020/0137822 A1* | 4/2020 | Lee | H04W 72/1268 |
| 2020/0154411 A1* | 5/2020 | Liu | H04L 29/08 |
| 2020/0178291 A1* | 6/2020 | Sha | H04L 1/08 |
| 2020/0245395 A1* | 7/2020 | Zhang | H04L 5/0053 |
| 2020/0275376 A1* | 8/2020 | Lee | H04W 52/0251 |
| 2021/0076445 A1* | 3/2021 | Tsai | H04W 76/19 |

OTHER PUBLICATIONS

Huawei; HiSilicon. RAN2 impact of shortened processing time and TTI on DRX. 3GPP TSG-RAN2 Meeting #96, R2-168253. Nov. 4, 2016(Nov. 4, 2016) the whole document.

* cited by examiner

DISCONTINUOUS RECEPTION OPERATIONS AMONG MULTIPLE BANDWIDTH PARTS

CROSS-REFERENCE TO RELATED APPLICATION(S)

The present application claims the benefit of and priority to a provisional U.S. Patent Application Ser. No. 62/589,628 filed on Nov. 22, 2017, entitled "DRX Operation Among Multiple Bandwidth Parts," (hereinafter referred to as "US72371 application"). The disclosure of the US72371 application is hereby incorporated fully by reference into the present application.

FIELD

The present disclosure generally relates to wireless communication, and more particularly, to devices and methods for discontinuous reception operations.

BACKGROUND

In a wireless communication network, such as a long term evolution (LTE) or an evolved LTE (eLTE) network, discontinuous reception (DRX) is commonly used between a base station and one or more user equipments (UEs) to preserve battery life of the UEs. For example, during DRX, a UE may switch off its RF module and/or suspend control channel monitoring between data transmissions to reduce power consumption. The UE may periodically monitor the control channel (e.g., a physical downlink control channel (PDCCH)) with preconfigured ON/OFF cycles based on, for example, the base station's configuration and real traffic pattern, even when there is no data transmission. During active time (e.g., ON cycles), the UE monitors the PDCCH for possible data transmission/reception indication. When data transmission occurs during the active time, the UE may stay active to finish the transmission.

In order to increase flexibility on data scheduling in the next generation (e.g., fifth generation (5G) new radio (NR)) wireless communication networks, the 3$^{rd}$ Generation Partnership Project (3GPP) has introduced new designs on forming frame structures and allocating control channels, where not all elements in a frame structure will have a fixed time unit.

Thus, there is a need in the art for devices and methods for controlling and managing DRX operation for the next generation wireless communication networks.

SUMMARY

The present disclosure is directed to DRX operations among multiple bandwidth parts.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
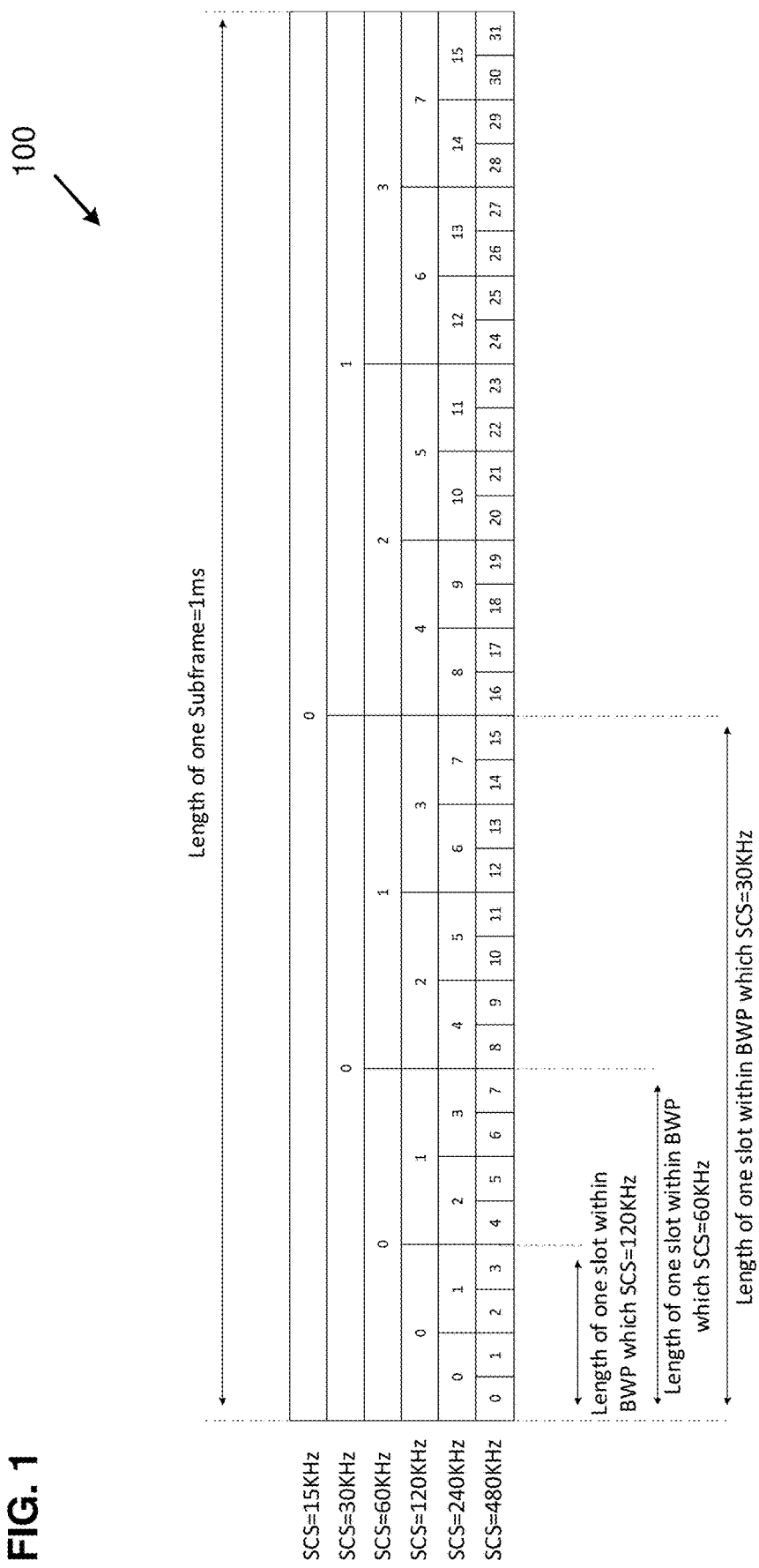
FIG. 1 is a slot structure, according to an example implementation of the present application.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), 5G Core Network (5GC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the downlink and optionally uplink resources to at least one UE within the cell's radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for the next generation (e.g., 5G NR) wireless communication networks is to support flexible configurations for accommodating various next generation communication requirements, such as eMBB, mMTC, and URLLC, while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

In LTE wireless communication systems, during DRX operation, a UE's Medium Access Control (MAC) entity may be configured by Radio Resource Control (RRC) with a DRX functionality that controls the UE's Physical Downlink Control Channel (PDCCH) monitoring activities for the MAC entity's Common-Radio Network Temporary Identifier (C-RNTI), transmit power control Physical Uplink Control Channel (PUCCH) Radio Network Temporary Identifier (TPC-PUCCH-RNTI), transmit power control Physical Uplink Shared Channel (PUSCH) Radio Network Temporary Identifier (TPC-PUSCH-RNTI), Semi-Persistent Scheduling C-RNTI (if configured), uplink (UL) Semi-Persistent Scheduling Virtual-RNTI (V-RNTI) (if configured), enhanced interference mitigation with traffic adaptation-RNTI (eIMTA-RNTI) (if configured), sidelink-RNTI (S-RNTI) (if configured), SL-V-RNTI (if configured), Component Carrier-RNTI (CC-RNTI) (if configured), and Sounding Reference Signal (SRS)-TPC-RNTI (SRS-TPC-RNTI) (if configured). When in the RRC_CONNECTED state, if DRX is configured, the MAC entity is allowed to monitor the PDCCH discontinuously using DRX operation. The RRC controls the DRX operation by configuring one or more of the following timers and parameters: DRX On Duration Timer (onDurationTimer), DRX Inactivity Timer (drx-InactivityTimer), DRX Retransmission Timer (drx-RetransmissionTimer), DRX UL Retransmission Timer (e.g., drx-ULRetransmissionTimer), DRX Long Cycle (longDRX-Cycle), DRX Start Offset (drxStartOffset), DRX Short Cycle (shortDRX-Cycle), and DRX Short Cycle Timer (drxShortCycleTimer), as list in table I. Based on the DRX configuration provided by the base station (e.g., an evolved NodeB (eNB)), the UE is configured with the exact active time. When a DRX cycle is configured, the active time includes time indicated by the ON Duration Timer, the DRX Inactivity Timer, the DRX Retransmission Timer, the DRX UL Retransmission Timer, and/or a MAC-Contention Resolution Timer.

In addition, the UE's MAC entity may be configured with two HARQ timers: HARQ RTT timer (e.g., HARQ-RTT-Timer) and UL HARQ RTT timer (e.g., UL-HARQ-RTT-Timer). Based on the DRX configuration provided by the base station, the UE may specify the active time. When a DRX cycle is configured, the active time includes the time while DRX On Duration Timer, DRX Inactivity Timer, DRX Retransmission Timer, DRX UL Retransmission Timer or MAC-ContentionResolutionTimer is running.

According to the purposes and usages addressed in present application, these parameters can be categorized into four aspects: DRX Cycle, Data Transmission, Data Retransmission and HARQ. In addition, these parameters may have different time units. For example, the parameters related to DRX Cycle and HARQ are configured with time units in subframe (sf), and the parameters related to Data Transmission and Data Retransmission are configured with PDCCH subframe (psf).

TABLE I

List of parameters in DRX

| Purpose | Name | Parameters | Time Unit |
|---|---|---|---|
| DRX Cycle | short DRX Cycle | shortDRX-Cycle | sf |
| | long DRX Cycle | longDRX-Cycle | sf |
| | DRX start offset | drxStartOffset | sf |
| Data Transmission | ON duration Timer | onDurationTimer | psf |
| | DRX inactivity Timer | drx-InactivityTimer | psf |
| Data Retransmission | DRX retransmission Timer | drx-RetransmissionTimer | psf |
| | DRX UL retransmission Timer | drx-ULRetransmissionTimer | psf |
| HARQ | HARQ RTT timer | HARQ RTT timer | sf |
| | UL HARQ RTT timer | UL HARQ RTT timer | sf |

In the next generation (e.g., 5G NR) wireless communication networks, there are at least three different types of time units: Fix time unit (FTU), Scalable time unit (STU) and Absolute time (AT). For example, subframes, frames and hyper-frames are FTUs, while slots and symbols are STUs. The subframes, frames and hyper-frames are each configured with a fixed length of time, for example, 1 ms, 10 ms, and 10240 ms. Different from LTE, the slot length in the next generation (e.g., 5G NR) wireless communication networks is not static due to the differences in symbol lengths. As symbol length is inversely proportional to subcarrier spacing (SCS), the number of slots within a subframe may vary depending on, for example, SCS. Hence, the number of slots within one subframe is a variance.

FIG. 1 is a slot structure, in accordance with an example implementation of the present application. As shown in FIG. 1, depending on the numerology (e.g., subcarrier spacing), there may be 1, 2, 4, 8, 16 or 32 slots per subframe. It is noted that an STU may also be presented by absolute time. For example, 3 symbols can also be presented as 3 of symbol length (e.g., $\frac{1}{28}$ ms for SCS=30 KHz, normal CP case). In a next generation (e.g., 5G NR) wireless communication network, depending on the cyclic prefix (CP) type (normal or extend), there are either 12 or 14 symbols per slot. Hence, based on the FIG. 1, the length of each symbol for each SCS configuration is listed in Table II.

TABLE II

Symbol Lengths in NR

| | | | Extended CP | | Normal CP | |
|---|---|---|---|---|---|---|
| SCS (KHz) | slot/sub-frame | slot length (ms) | symbols/slot | symbols length (ms) | symbols/slot | symbols length (ms) |
| 15 | 1 | 1 | 12 | $\frac{1}{12}$ | 14 | $\frac{1}{14}$ |
| 30 | 2 | $\frac{1}{2}$ | 12 | $\frac{1}{24}$ | 14 | $\frac{1}{28}$ |
| 60 | 4 | $\frac{1}{4}$ | 12 | $\frac{1}{48}$ | 14 | $\frac{1}{56}$ |
| 120 | 8 | $\frac{1}{8}$ | 12 | $\frac{1}{96}$ | 14 | $\frac{1}{112}$ |
| 240 | 16 | $\frac{1}{16}$ | 12 | $\frac{1}{192}$ | 14 | $\frac{1}{224}$ |
| 480 | 32 | $\frac{1}{32}$ | 12 | $\frac{1}{384}$ | 14 | $\frac{1}{448}$ |

Moreover, in NR, a bandwidth adaptation mechanism has been introduced to reduce UE energy consumption by dividing a wide band into several bandwidth parts (BWPs). Different from DRX that reduces a UE's monitoring activity in the time domain, for bandwidth adaptation, the UE reduces PDCCH monitoring in the frequency domain. When the UE has a large amount of UL/DL data for transmission, the UE may be switched to a wide band BWP by, for example, downlink control information (DCI). However, when the UE has little or no data traffic, the UE may be switched to a narrow band BWP explicitly by DCI or implicitly by a BWP inactivity timer (e.g., BWP-inactivity-Timer).

In some implementations, a UE may be configured with multiple BWPs, with only one BWP being activated at a time. In some implementations, a UE may be configured with multiple BWPs, with more than one BWP being activated at a time.

In various implementations of the present application, a UE's active BWP may be switched either by an indication within DCI or by a preconfigured BWP inactivity timer. For BWP switching, a base station (e.g., a gNB) may use DCI to switch a UE's active BWP, and configure a BWP inactivity timer to the UE for switching BWPs from a non-default BWP back to a default BWP.

As described in the DRX introduction above, several timers (e.g., ON duration timer, DRX inactivity timer, HARQ RTT timers and DRX retransmission timers) may be triggered during a DRX operation. In addition, the BWP inactivity timer may be independent from the DRX timers. For example, the triggering condition and how to count the BWP inactivity timer may not be affected or interfered by the DRX timers. It is noted that the HARQ RTT timers described in the present application may include a DL HARQ RTT timer and a UL HARQ RTT timer. Also, the DRX retransmission timers described in the present application may include a DL DRX retransmission timer and a UL DRX retransmission timer.

In a 5G NR wireless communication network, two different scheduling mechanisms, slot-based scheduling and non-slot-based scheduling, are supported. For slot-based scheduling, since each slot includes a PDCCH occasion, a base station (e.g., an eNB or a gNB) may perform data scheduling on a per slot basis. In other words, the shortest time interval between two data scheduling can be a slot in 5G NR wireless communication networks, which has a smaller time granularity than a subframe in LTE wireless communication networks. For non-slot-based scheduling mechanism, the data scheduling is not bundled with slots. The UE is to be configured with a UE-specific control resource set (CORESET) configuration which may include time and frequency resource allocation information that the UE needs to monitor. The CORESET configuration also includes a CORESET monitor periodicity. The CORESET monitor periodicity can be in symbol(s). Hence, the base station may perform more than one data scheduling within one slot, and may also have a smaller time granularity than slot-based scheduling. In slot-based scheduling, the UE may be configured with a CORESET configuration, which indicates time and frequency resource allocation information that the UE needs to monitor within the PDCCH in each slot.

Furthermore, in 5G NR wireless communication networks, the DRX parameters may be configured with different time units (e.g., FTU, STU or AT). For example, the DRX Short Cycle Timer (drx-ShortCycleTimer), the DRX Long Cycle (drx-LongCycle), the DRX ON Duration Timer (drx-onDurationTimer), and the DRX Inactivity Timer (drx-InactivityTimer) may be configured by AT (e.g., millisecond (ms)). Hence, the DRX operation, in 5G NR wireless communication networks, are more flexible than the DRX operation in LTE wireless communication networks. For example, in LTE networks, the DRX Inactivity Timer may be triggered after a subframe in which a PDCCH indicates an initial uplink, downlink or sidelink user data transmission. As indicated in Table I, the DRX Inactivity Timer is configured with psf. In 5G NR networks, the DRX Inactivity Timer may be configured by milliseconds (ms). Hence, detailed behaviors of the DRX operation need to be adjusted accordingly. For example, the starting time and/or expiration time of the short DRX Cycle, the long DRX Cycle, the ON Duration Timer and the DRX Inactivity Timer need to be addressed.

In LTE networks, the ON Duration Timer may be triggered when one of the two following formulas is satisfied:

Short DRX Cycle is used and [($SFN$*10)+subframe number] modulo (shortDRX-Cycle)=(drxStart-Offset) modulo (shortDRX-Cycle)     (1)

Long DRX Cycle is used and [($SFN$*10)+subframe number] modulo (longDRX-Cycle)=drxStartOffset     (2)

where SFN is a system frame number.

Since the ON Duration Timer is configured by psf, the starting time of the ON Duration Timer is at the beginning of a subframe (since each subframe includes a PDCCH) when the ON Duration Timer is triggered. However, the ON Duration Timer in 5G NR networks is configured in, for example, ms, and the actual starting time of the ON Duration Timer may have several possible starting positions.

In the present application, various DRX operations among multiple BWPs in NR are described, especially with reference to the following: ON duration Timer starting time, DRX inactivity Timer starting time, HARQ timer starting time, DRX retransmission Timer counting, and UE behavior upon expiration of the DRX inactivity Timer.

In 5G NR networks, there are ten subframes per system frame, $N_{slot}^{sf}$ slots per subframe, and $N_{symbol}^{slot}$ symbols per slot. In other words, there are $N_{symbol}^{slot}*N_{slot}^{sf}$ symbols per subframe, and $10*N_{symbol}^{slot}*N_{slot}^{sf}$ symbols per system frame.

Figure 2:
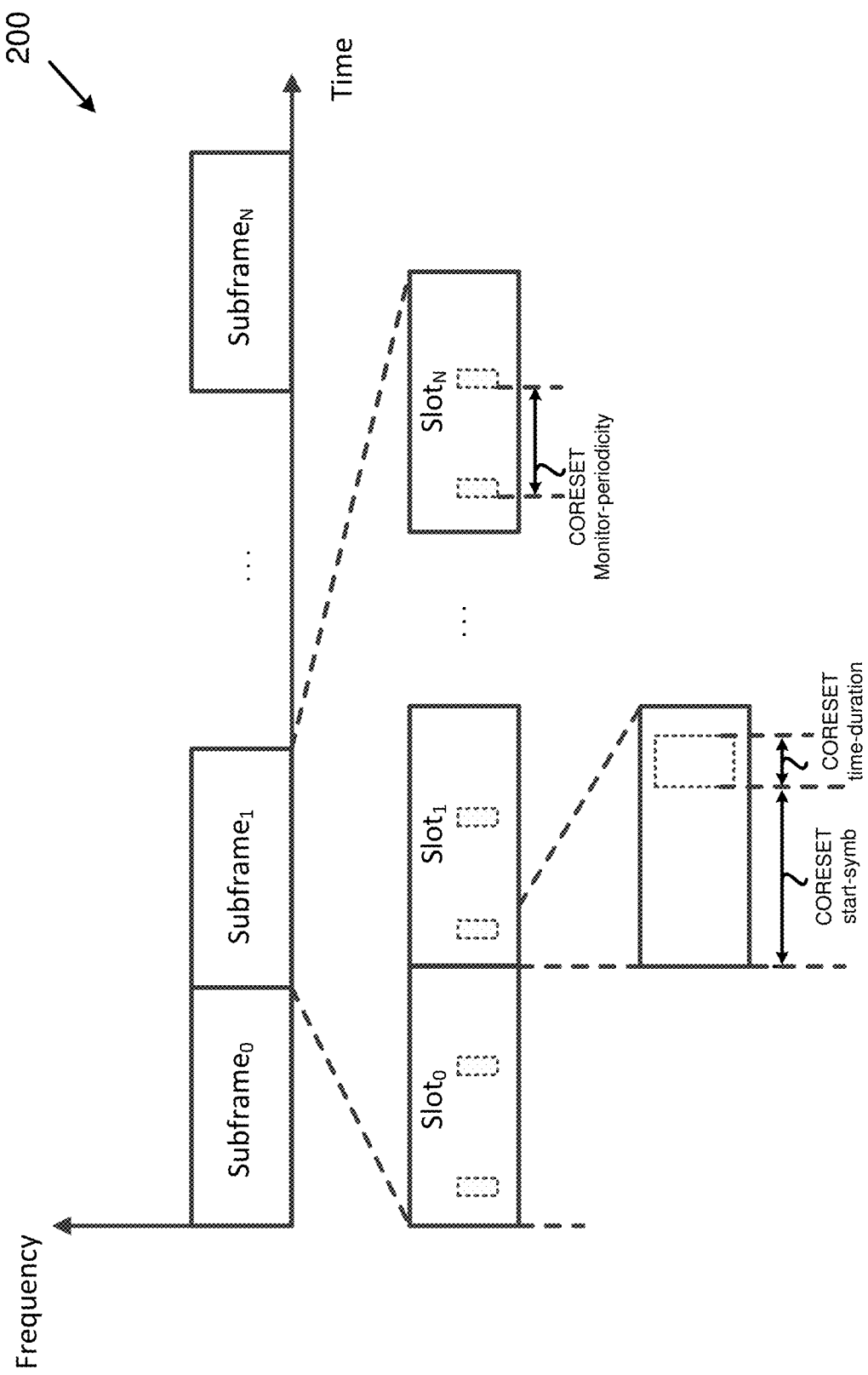
FIG. 2 is a schematic diagram illustrating a frame structure with data scheduling and showing various location(s) of a CORESET, according to example implementations of the present application.

Referring to FIG. 2, a UE may be configured with a CORESET configuration that includes several parameters for indicating the location(s) of the CORESET. For example, the CORESET configuration includes a starting symbol for the CORESET (CORESET-start-symb) and the continuous time duration of the CORESET (CORESET-time-duration). Table III includes the abbreviations and descriptions of the parameters used in the present application.

TABLE III

Abbreviations of parameters

| Abbreviation | Description |
| --- | --- |
| STU | Scalable Time Unit; For example, slot and symbol are the STU. |
| FTU | Fix Time Unit; For example, subframe, frame and hyper-frame. |
| $N_{symbol}^{slot}$ | Number of symbol per slot configured by gNB |
| $N_{slot}^{sf}$ | Number of slot per subframe configured by gNB |
| $T_{symbol}$ | Length of a symbol in ms configured by gNB |
| CORESET-start-symb | Starting symbol for the CORESET; counting from the front edge of each slot (as shown in FIG. 1) |
| CORESET-time-duration | Contigouse time duration of the CORESET |
| CORESET-Monitor-periodicity | Time interval between CORESETs the UE is configured to monitor |

In 5G NR wireless communication networks, during DRX operation, a base station (e.g., a gNB) may provide DRX configuration having one or more of the following timers and parameters: DRX On Duration Timer (drx-onDurationTimer), DRX Inactivity Timer (drx-InactivityTimer), DRX Retransmission Timer (drx-RetransmissionTimerDL), DRX UL Retransmission Timer (drx-RetransmissionTimerUL), DRX Long Cycle (drx-LongCycle), DRX Start Offset (drx-StartOffset), DRX Short Cycle (drx-ShortCycle), DRX Short Cycle Timer (drx-ShortCycleTimer), DRX Slot Offset (drx-SlotOffset), DRX DL HARQ RTT Timer (drx-HARQ-RTT-TimerDL), DRX UL HARQ RTT Timer (drx-HARQ-RTT-TimerUL), and random access-Contention Resolution Timer (ra-ContentionResolutionTimer).

Figure 3:
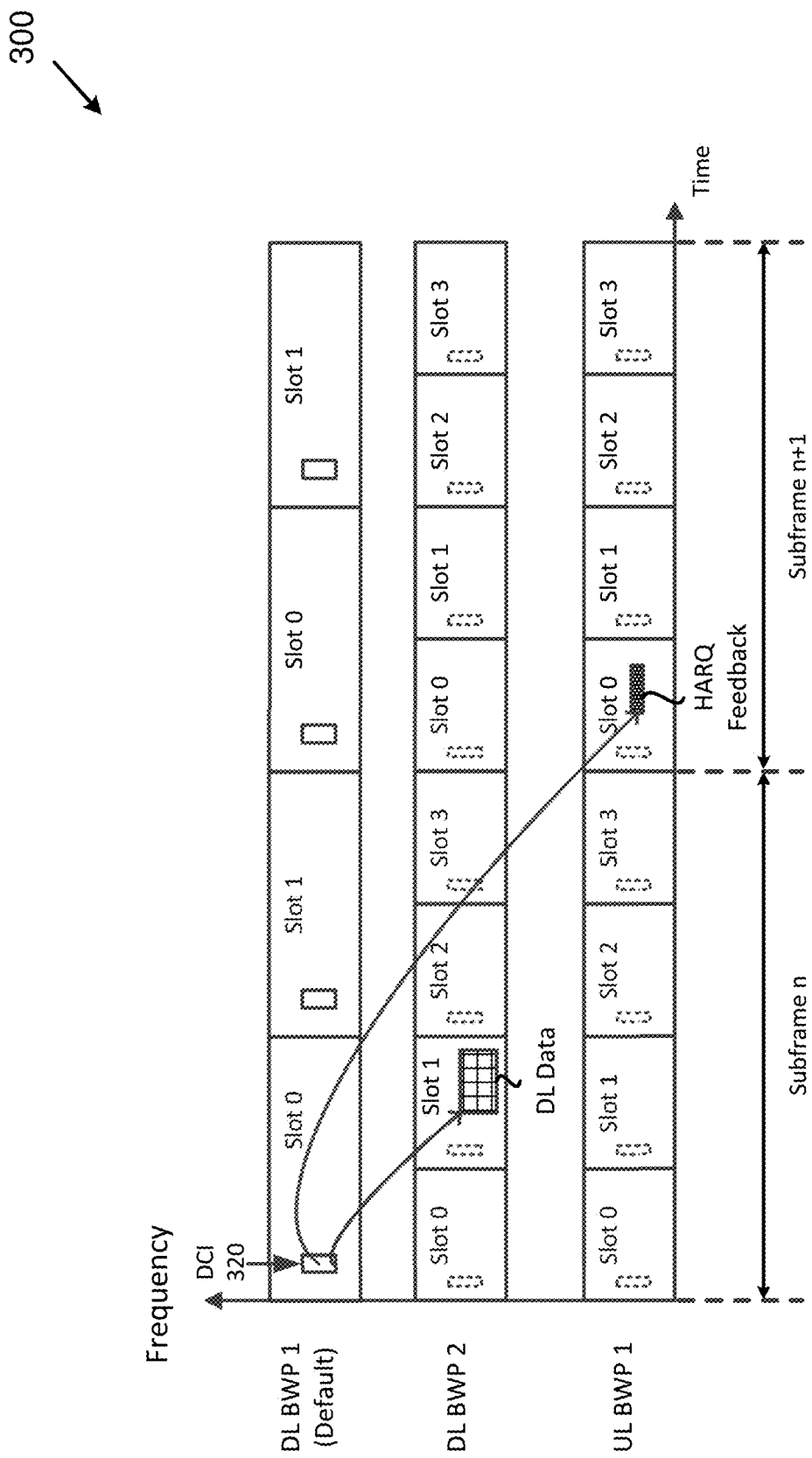
FIG. 3 is a schematic diagram illustrating cross BWP scheduling, according to example implementations of the present application.

As shown in diagram 300 of FIG. 3, a UE is configured with multiple BWPs, and with DRX operation. In the present implementation, there is one DL and UL BWP to be activated at a time. A DL BWP 1 is configured as a default BWP. It is noted that the slot length of default BWP and other BWPs can be different. In addition, a base station (e.g., a gNB) may perform cross-BWP scheduling when the UE is configured with multiple BWPs. For example, as shown in FIG. 3, the UE is configured with DL BWPs (one of the DL BWPs is a default BWP configured by the gNB) and an uplink (UL) BWP. In slot 0 of subframe n of DL BWP 1, the base station indicates the UE, by DCI, a DL data reception in slot 1 of subframe n of DL BWP 2 and a corresponding HARQ feedback transmission radio resource in slot 0 of subframe n+1 of UL BWP 1.

Case 1: DRX Cycle and Data Transmission

The determination of ON duration Timer starting time is based on at least one of hyper system frame number (H-SFN), system frame number (SFN), subframe number, slot number, symbol number, and based on certain parameters (e.g., longDRX-Cycle, shortDRX-Cycle, drxStartOffset, drxStartOffset_slot, CORESET-start-symb, CORESET-Monitor-periodicity, and etc.) configured by the base station (e.g., a gNB).

In the present implementation, the longDRX-Cycle, shortDRX-Cycle and drxStartOffset parameters are substantially similar to those in LTE networks. The drxStart Offset_slot is similar to the drxStartOffset in LTE networks. While the drxStartOffset indicates the offset (in subframe level) from the beginning of a DRX cycle, the drxStartOffset_slot indicates the offset (in slot level) from the first slot of a subframe indicated by the drxStartOffset. As a UE may be configured with multiple BWPs, for each BWP, the slot length and CORESET configuration (e.g., more than one DL BWP which has at least one PDCCH) can be different from other BWPs. Hence, the calculation formula for the ON duration timer triggering time among these BWPs may be for the following:

a) ON duration timer starting time calculation for a default DL BWP configured by the base station;
b) ON duration timer starting time calculation for a reference BWP which is explicitly indicated by a reference BWP indication within a downlink RRC message (e.g., RRCConnectionsetup, RRCConnectionreconfiguration (or RRCreconfiguration in NR)) transmitted by the base station;
c) ON duration timer starting time calculation implicitly aimed for the BWP that broadcasted the minimal system information;
d) ON duration timer starting time calculation for the current active DL BWP;
e) ON duration timer starting time calculation for the BWP that has longest slot length; and/or
f) ON duration timer starting time calculation for the BWP which has shortest slot length.

As shown in FIG. 3, DCI 320 may be decoded by the UE (in slot 0 of subframe n in DL BWP 1), and indicate a new data transmission/reception (in slot 1 of subframe n in DL BWP 2). Upon receipt and/or decoding of DCI 320, the UE may trigger/reset a DRX inactivity timer. There are several positions on the starting/restarting time of the DRX inactivity timer among multiple BWPs operation, especially when an active BWP is switched by a cross BWP scheduling along with the BWP switching DCI (e.g., DCI 320) as shown in FIG. 3:

a) Within the active or default BWP, the DRX inactivity timer may be started or restarted from the slot which receives the DCI (e.g., slot 0 of subframe n in DL BWP 1).
b) After the UE switches to a BWP (e.g., DL BWP 2 in FIG. 3) for data transmission/reception, the DRX inactivity timer may be started or restarted from the slot indicated by the data reception or transmission (e.g., slot 1 of subframe n in DL BWP 2) scheduling DCI.

For each of the positions (a) and (b) listed above, the exact starting time of the DRX inactivity timer within the slot may be right after the end of the CORESET (e.g., the front edge of upcoming first symbol), at the end of the PDCCH (e.g., the front edge of upcoming first symbol), at the end of the slot (e.g., the front edge of upcoming first symbol), or at the begin of the slot or at the end of the subframe contained in the slot.

Case 2: HARQ and Retransmission

In various implementations of the present application, the DL and UL HARQ RTT timers may be configured through RRC signaling. The time unit of the HARQ RTT timers may be in millisecond(s). A DL HARQ RTT timer may be started after a PUCCH transmission. For example, a DL HARQ RTT timer may start after a HARQ feedback. A UL HARQ RTT timer may be started after a PUSCH transmission. A DL DRX retransmission timer may be started when the DL HARQ RTT timer expires. A UL DRX retransmission timer may be started when the UL HARQ RTT timer expires. However, the exact starting time of the DL/UL RTT timer, DL/UL DRX retransmission Timer and the unit of the DL/UL DRX retransmission Timer needs to be specified more clearly. NR has both paired spectrum and unpaired spectrum configurations for BWP operation. Both spectrum configurations are described herein.

Figure 4A:
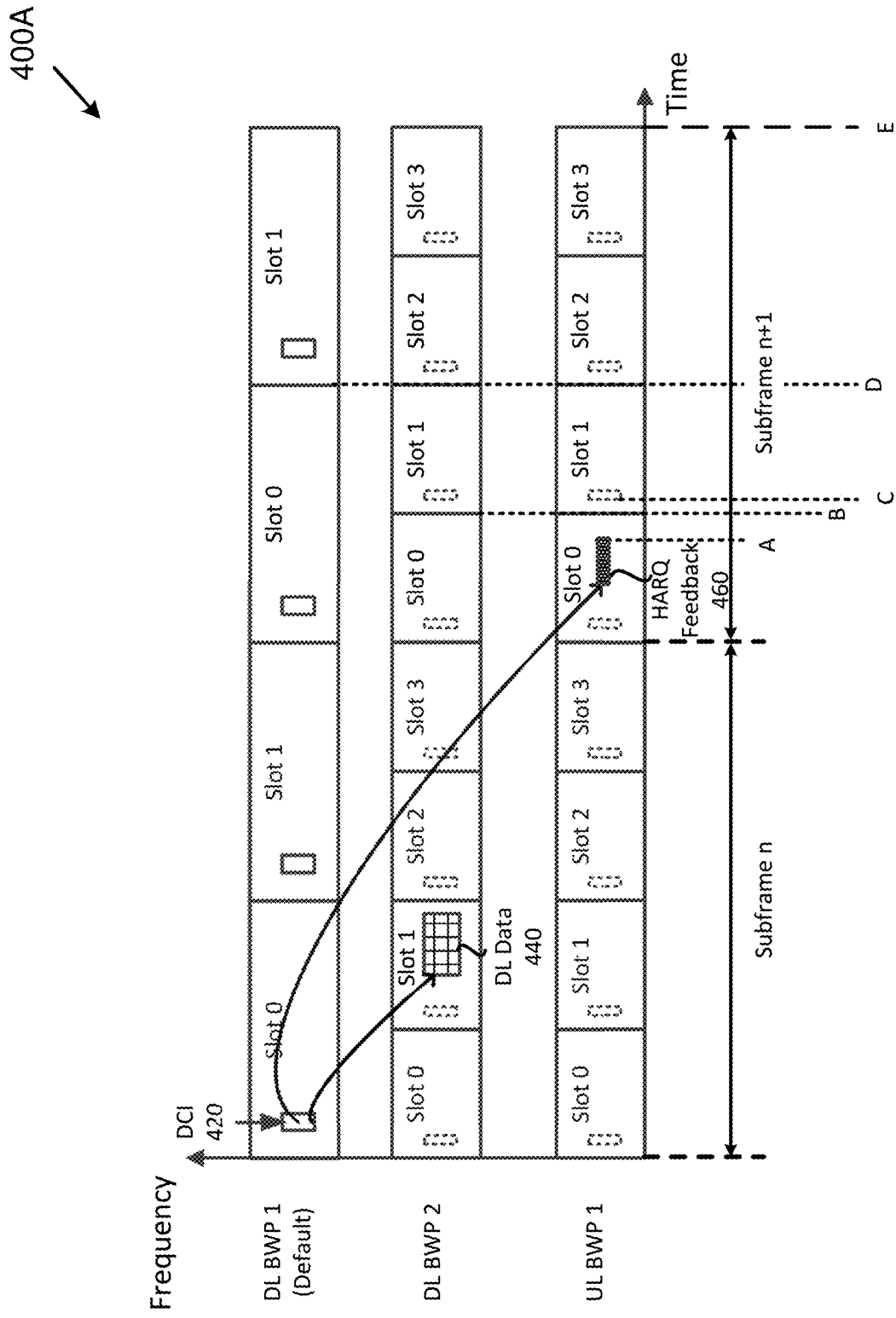
FIG. 4A is a diagram showing various starting time positions of a DL RTT timer-paired spectrum (FDD), in accordance with various implementations of the present application.

FIG. 4A is a diagram showing various starting time positions of a DL RTT timer-paired spectrum (FDD), in accordance with various implementations of the present application.

As shown in diagram 400A of FIG. 4A, there are several positions for the DL RTT timer starting time for paired spectrum:

a) the DL RTT timer may start at the front edge of the upcoming first symbol after the end UL HARQ feedback for the DL data reception (e.g., starting the the drx-HARQ-RTT-TimerDL (for a corresponding HARQ process) in the first symbol after the end of a corresponding transmission carrying DL HARQ feedback 460 for DL data reception 440 indicated by DCI 420);
b) the DL RTT timer starts at the end of the slot (within the BWP which the UE transmits UL HARQ feedback) of UL HARQ feedback for the DL data reception;
c) the DL RTT timer starts from the front edge of upcoming CORESET after the UL HARQ feedback for the DL data reception;
d) the DL RTT timer starts at the end of first slot within the default BWP which overlapped (in time domain) with the slot within the BWP which the UE transmits UL HARQ feedback; and/or
e) the DL RTT timer starts at the end of subframe which the UE transmits UL HARQ feedback for the DL data reception.

Figure 4B:
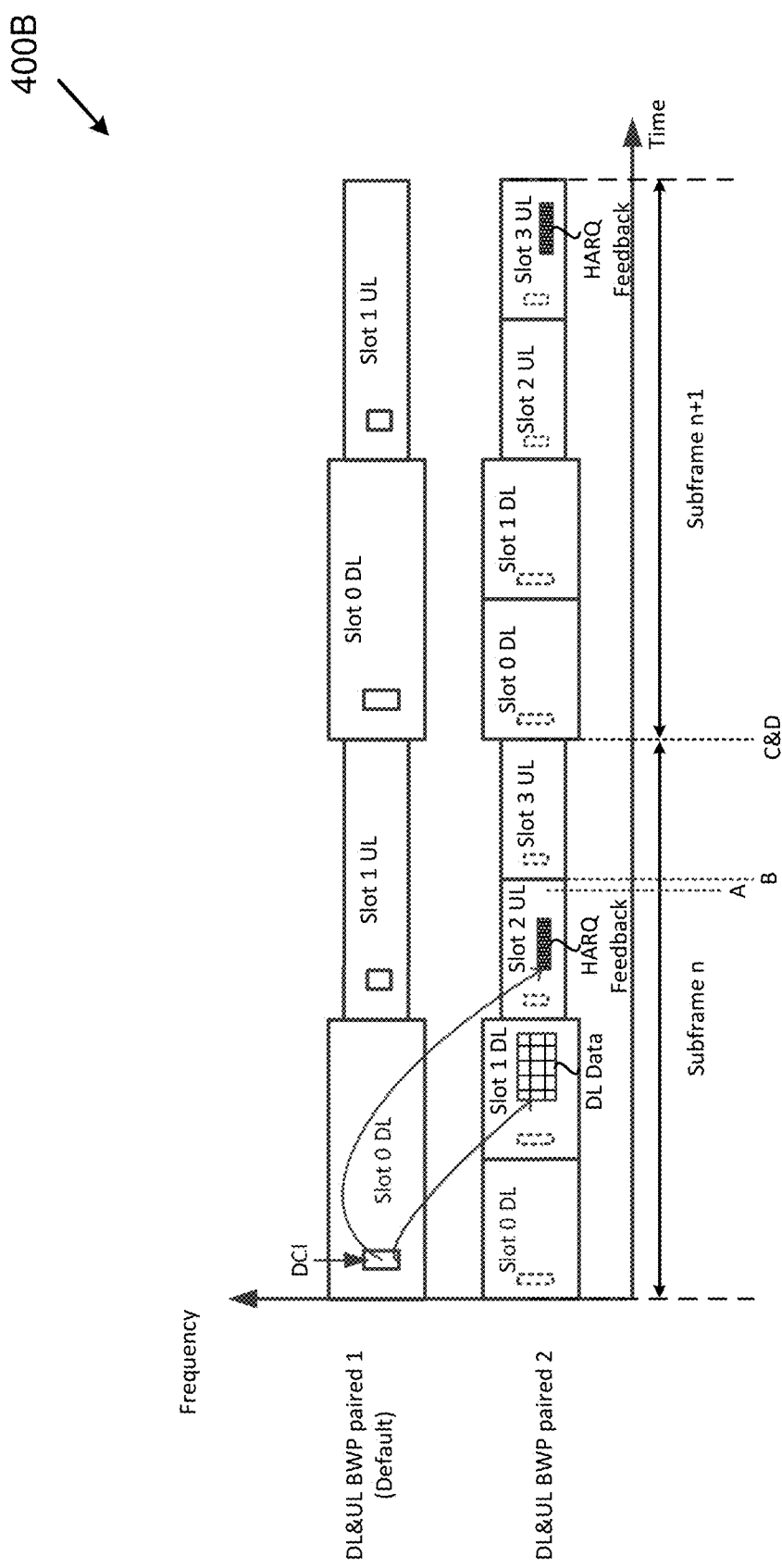
FIG. 4B is a diagram showing various positions for the DL RTT timer starting time for unpaired spectrum (TDD), according to various implementations of the present application.

As shown in diagram 400B of FIG. 4B, there are several positions for the DL RTT timer starting time for unpaired spectrum (TDD):

a) the DL RTT timer may start right at the end the UL HARQ feedback for the DL data reception;
b) the DL RTT timer may start at the end of the slot (within the BWP which the UE transmits UL HARQ feedback) of the UL HARQ feedback for the DL data reception;
c) the DL RTT timer may start at the end of first slot within the default BWP which overlapped (in time domain) with the slot within the BWP which the UE transmits the UL HARQ feedback; and/or
d) the DL RTT timer may start at the end of subframe which the UE transmits the UL HARQ feedback for the DL data reception.

Figure 4C:
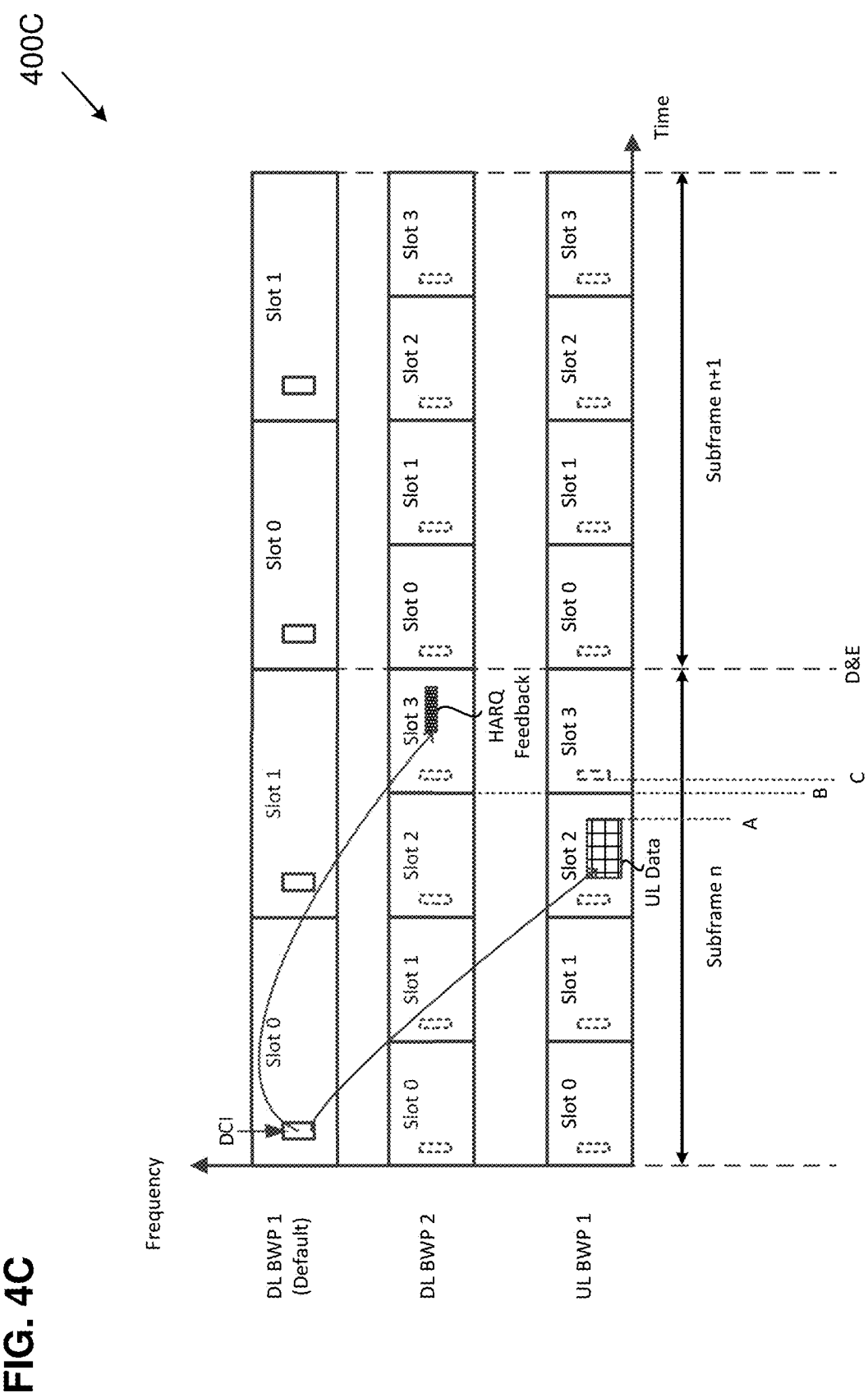
FIG. 4C is a diagram showing various positions for the UL RTT timer starting time for paired spectrum (FDD), according to various implementations of the present application.

As shown in diagram 400C of FIG. 4C, there are several positions for the UL RTT timer starting time for paired spectrum (FDD):

a) the UL RTT timer may start right at the end of the UL data transmission (e.g., starting the drx-HARQ-RTT-TimerUL (for a corresponding HARQ process) in the first symbol after the end of a corresponding PUSCH transmission (e.g., having UL-data));
b) the UL RTT timer may start at the end of the slot (within the BWP where the UE transmits the UL data) in which the UE transmits the UL data;
c) the UL RTT timer may start from the front edge of the upcoming CORESET after the UL data transmission;
d) the UL RTT timer may start at the end of first slot within the default BWP which overlapped (in time domain) with the slot within the BWP where the UE transmits the UL data; and/or
e) the UL RTT timer may start at the end of subframe where the UE transmits the UL data.

Figure 4D:
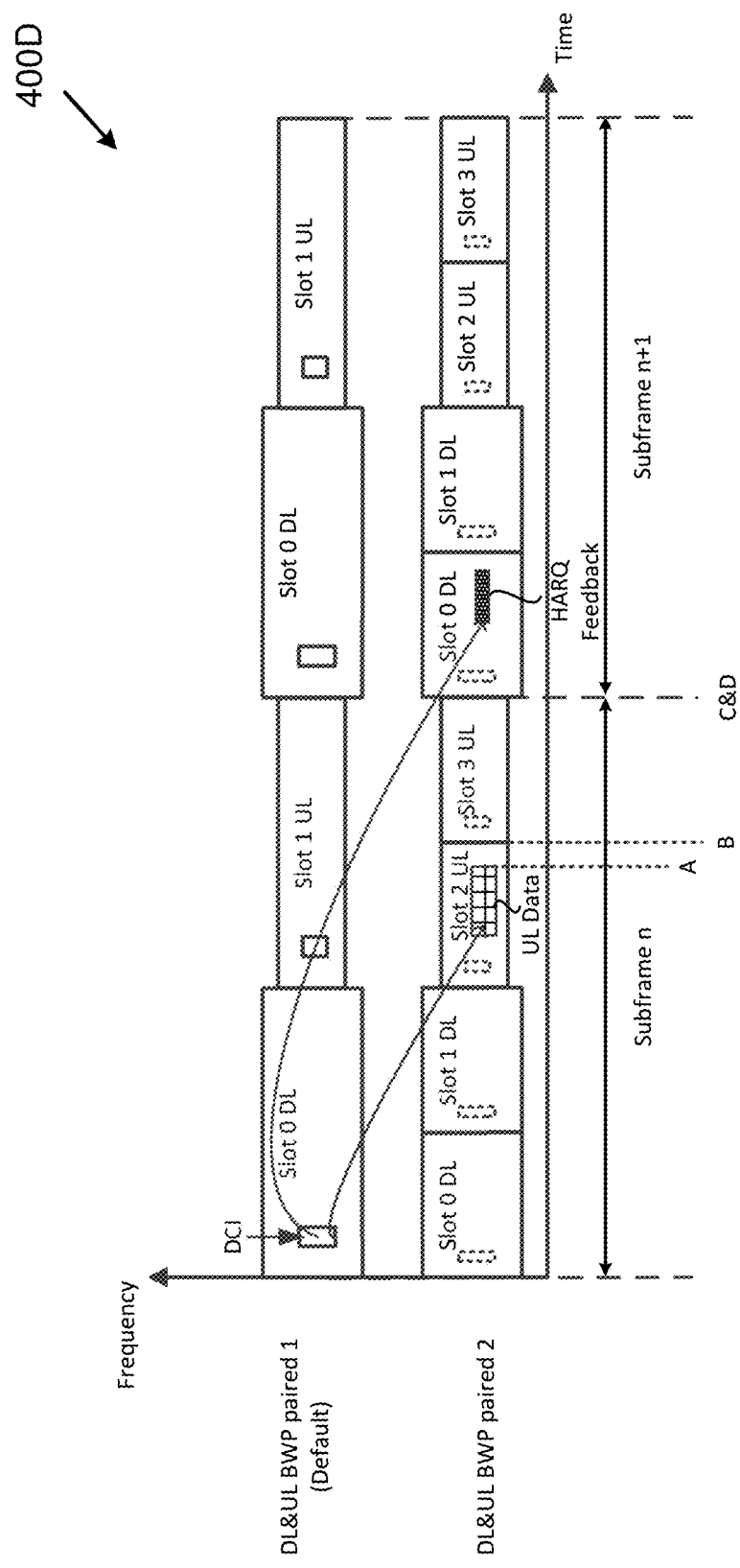
FIG. 4D is a diagram showing various positions for the UL RTT timer starting time for unpaired spectrum (TDD), according to various implementations of the present application.

As shown in diagram 400D of FIG. 4D, there are several positions for the UL RTT timer starting time for unpaired spectrum (TDD):
a) the UL RTT timer may start right at the end of the UL data transmission;
b) the UL RTT timer may start at the end of the slot (within the BWP in which the UE transmits the UL data) in which the UE transmits UL data;
c) the UL RTT timer may start at the end of the first slot within the default BWP which overlapped (in time domain) with the slot within the BWP in which the UE transmits the UL data; and/or
d) the UL RTT timer may start at the end of subframe in which the UE transmits the UL data.

The value of UL RTT timer may be determined based on a predefined table which has a mapping between a slot/symbol index and the value of UL RTT timer. In addition, the table can be numerology and/or SCS and/or slot format related information (SFI) specific. It means that the UE may need to apply a numerology and/or SCS and/or slot format specific table according to the numerology, SCS and slot format of the active BWP.

The RTT timers and DRX retransmission timers are configured for controlling UE's DRX states transition during data retransmission time intervals. The configurations of these timers are closely related to the base station's scheduling and control channel allocation/opportunity (e.g., CORESET configuration). Thus, the value and unit of these timers may have some dependency with the frame structure. For example, the configurations need to consider the period of CORESET and the length of the slot.

In some implementations, the base station may configure, for the UE, multiple configurations of the RTT timers and DRX retransmission timers, each of the configurations is corresponding to a configured BWP. In some implementations, the UE may have corresponding configurations of RTT timers and DRX retransmission timers for each BWP having different slot length. In some implementations, the UE may have one configuration of RTT timers and DRX retransmission timers for the default BWP and another configuration of RTT timers and DRX retransmission timers for BWPs other than the default BWP. In some implementations, the UE may have a corresponding configuration of RTT timers and DRX retransmission timers for each cell. In some other implementations, the UE may have one configuration of RTT timers and one configuration of DRX retransmission timers for a primary cell (PCell) and another configuration of RTT timers and another configuration of DRX retransmission timers for all secondary cells (SCells). In some other implementations, the UE may have one corresponding configuration of RTT timers and DRX retransmission timers per RRC entity. In such cases, a common RTT timer and DRX retransmission timer may be applied for every cell (PCell, SCell(s)) with every BWP (default BWP, active BWP) in each RRC entity, and the common RRT timer and DRX retransmission timer may be given a timing unit that may be automatically scaled based on associating cell/BWP. It is noted that the Master Node (MN)/Secondary Node (SN) may each have different RTT timers and DRX retransmission timers respectively based on associating RRC entity's configuration.

In some implementations, the base station may configure RTT timers and DRX retransmission timers with STU. It is noted that STU also can be present with AT. For example, 3 symbols can be present as three times of the symbol length (e.g., $3*(1/28)$ ms) for SCS=30 KHz, the normal CP case) in milliseconds (ms). This present type can be called as STU in ms. It means that the base station may configure the value and present type of unit of RTT timers and DRX retransmission timers separately.

In some implementations, the drx-HARQ-RTT-TimerDL is represented in number of symbols of a BWP where a transport block (e.g., downlink data) is received. In some implementations, the drx-HARQ-RTT-TimerUL is represented in number of symbols of a BWP where a transport block (e.g., uplink data) is transmitted.

Each of the BWPs, having different slot lengths, may have a different unit configuration in ms. In some implementations, the value can be shared (e.g., kept the same) among the BWPs. It means that, once a UE switches BWP, the UE may keep the value configuration for the RTT timers and DRX retransmission timers, but apply the new BWP's corresponding unit configuration in ms. The unit of the RTT timers and DRX retransmission timers may each have a specific time length, symbol length, slot length, multiple of symbol, slot length in default BWP, a reference BWP, CORESET period or smallest granularity of time unit.

When the DL/UL RTT timer expires, the UE may start the corresponding DRX DL/UL retransmission timer. The following are various positions of the exact starting time of the DRX DL/UL retransmission timer:
a) the front edge (in time domain) of the upcoming slot after the DL/UL RTT timer expires;
b) the front edge (in time domain) of the upcoming symbol after the DL/UL RTT timer expires (e.g., starting the drx-RetransmissionTimerDL in a first symbol after the expiry of a drx-HARQ-RTT-TimerDL, or starting a drx-RetransmissionTimerUL in a first symbol after the expiry of a drx-HARQ-RTT-TimerUL);
c) the front edge (in time domain) of the upcoming CORESET after the DL/UL RTT timer expires; and/or
d) the front edge (in time domain) of the upcoming PDCCH after the DL/UL RTT timer expires.

All the of edges described above may be either applied to current active BWP, any configured BWP whose edge is closest to the RTT timer expiration time, a predetermined BWP configured by the base station, paired BWP of the current active BWP, or the default BWP. In addition, the DRX UL retransmission timer can be terminated, while it is running, if the UE receives a HARQ ACK for the transmitted UL data. In some implementations, the UE may skip starting/triggering the DRX UL retransmission timer if the UE receives a HARQ ACK for the transmitted UL data before the DRX UL retransmission timer starts.

In some implementations, the drx-RetransmissionTimerDL is represented in number of slot lengths of a BWP where a transport block is received. In some implementations, the drx-RetransmissionTimerUL is represented in number of slot lengths of a BWP where a transport block is transmitted.

Case 3: BWP Inactivity Timer

In various implementations of the present application, a UE may start the BWP inactivity timer configured by a base station, when the UE switches from the default DL BWP to a DL BWP other than the default DL BWP, for example, by DCI. In some implementations, the DCI used for indicating BWP switching may also contain data scheduling. In addition, the BWP inactivity timer may be restarted when the UE successfully decodes a DCI for scheduling a Physical Downlink Shared Channel (PDSCH) in the UE's active DL BWP. The UE restarts the timer to the initial value when it successfully decodes the DCI to schedule PDSCH(s) in the UE's active DL BWP. The UE switches its active DL BWP to the default DL BWP when the timer expires. Various positions of the exact starting time and the unit of the BWP inactivity timer are described below.

Figure 5:
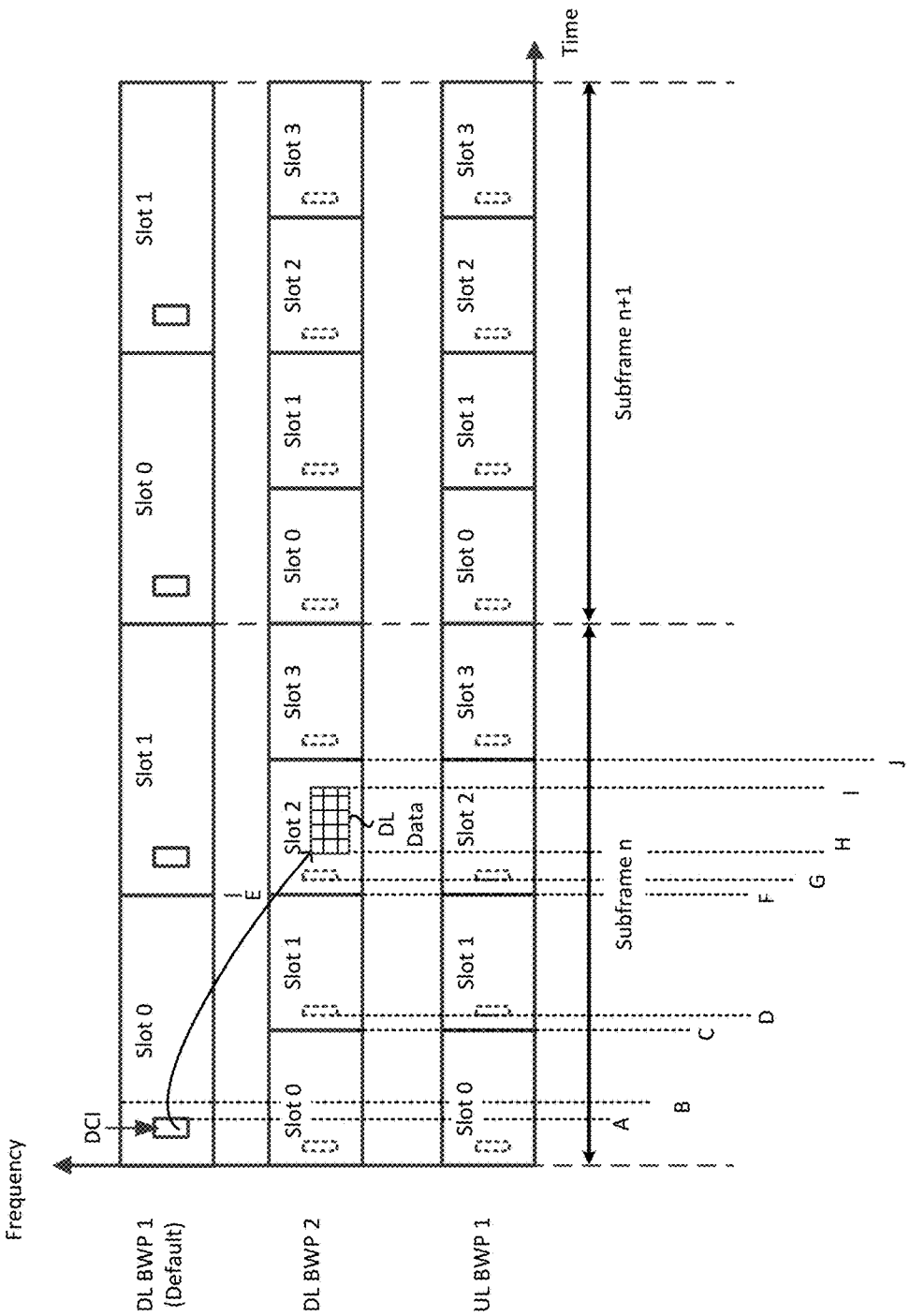
FIG. 5 is a schematic diagram illustrating various starting time positions of a BWP inactivity timer, according to example implementations of the present application.

In diagram 500 of FIG. 5, a base station may transmit a DCI to a UE in slot 0 of BWP 1 for indicating DL data reception in slot 2 of BWP 2, and for indicating the UE to perform BWP switching. There are several positions of the starting time of the BWP inactivity timer:

a) the end of the CORESET that transmits the DCI for the BWP switching;
b) the end of the PDCCH containing the CORESET that transmits the DCI for the BWP switching;
c) the front edge (in time domain) of the upcoming slot, within the BWP which scheduled for the DL data reception, after the DCI transmission;
d) the starting time of the CORESET of the upcoming slot, within the BWP that scheduled for DL data reception, after the DCI transmission;
e) the end of the slot which transmits the DCI for BWP switching;
f) the front edge (in time domain) of the slot within the BWP that scheduled for DL data reception;
g) the starting time of the CORESET of the slot within the BWP which scheduled for the DL data reception;
h) the starting time of the scheduled DL data reception within the BWP which scheduled for the DL data reception;
i) the end of the scheduled DL data reception within the BWP which scheduled for DL data reception; and/or
j) the end of the slot, in which the scheduled DL data reception ends, within the BWP that scheduled for DL data reception.

In addition, the base station may apply a specific DCI to indicate to the UE to restart, pause, disable, and/or modify the initial value or modify the unit (but keep the configured value) of the configured BWP switching timer without containing any data scheduling information. The indication may be determined by the base station based on a predefined or preconfigured lookup table. If the UE is indicated to disable the BWP Inactivity timer, or if the UE has not been configured with a BWP Inactivity timer, the UE may not switch its active BWP back to the default BWP until the UE transitions to RRC_IDLE state. For example, when the UE transitions to RRC_IDLE state in a non-default BWP, the UE should not re-enter the non-default BWP when it needs to transition back to RRC_CONNECTED state. Within the DCI indicating BWP switching, the base station may also indicate, to the UE, as to whether to trigger the BWP Inactivity timer or not. If not, the UE may not switch its active BWP until the UE transitions to RRC_IDLE or RRC_INACTIVE state when the BWP switching indication is received.

In some implementations, the base station may configure the BWP Inactivity timer with zero length or skipping the configuration of the BWP Inactivity timer. When the UE receives a DCI from the default BWP indicating that the DL data reception is in another BWP, the UE first switches to the BWP for DL data reception without triggering the BWP Inactivity timer, and then switches back to the default BWP immediately after the DL data reception is finished, or after the HARQ feedback for the DL data is finished, or after the HARQ feedback with an ACK message for the DL data is finished.

In some other implementations, the base station may implicitly or explicitly indicate, to a UE, whether to trigger a BWP Inactivity timer within a DCI. If the base station indicates not to trigger the BWP Inactivity timer, the UE performs BWP switching for data reception/transmission, and switches back to the default BWP immediately after the data reception/transmission is finished, or after the HARQ feedback/reception for the data reception/transmission is finished, or after the HARQ feedback/reception with an ACK message for the data reception/transmission is finished.

The unit for the BWP Inactivity timer may be configured with multiples of the length of a STU. The STU may be a symbol of the default BWP, a symbol of a reference BWP, a symbol of an active BWP indicated by the base station, a slot of the default BWP, a slot of a reference BWP, a slot of an active BWP indicated by the base station, a subframe, a frame or UE-specific paging cycles (RAN paging or core network paging scheme), a CORESET period of an active BWP indicated by the base station, a CORESET period of the default BWP, a CORESET period of a reference BWP. In another implementation, the BWP Inactivity timer may be configured with a specific time length directly in ms.

Case 4: Impact of BWP Switching

In Case 4, various BWP switching operations are described, while the DRX timers (e.g., ON duration timer, DRX inactivity timer, HARQ RTT timer and DRX retransmission timer) are running.

Figure 6A:
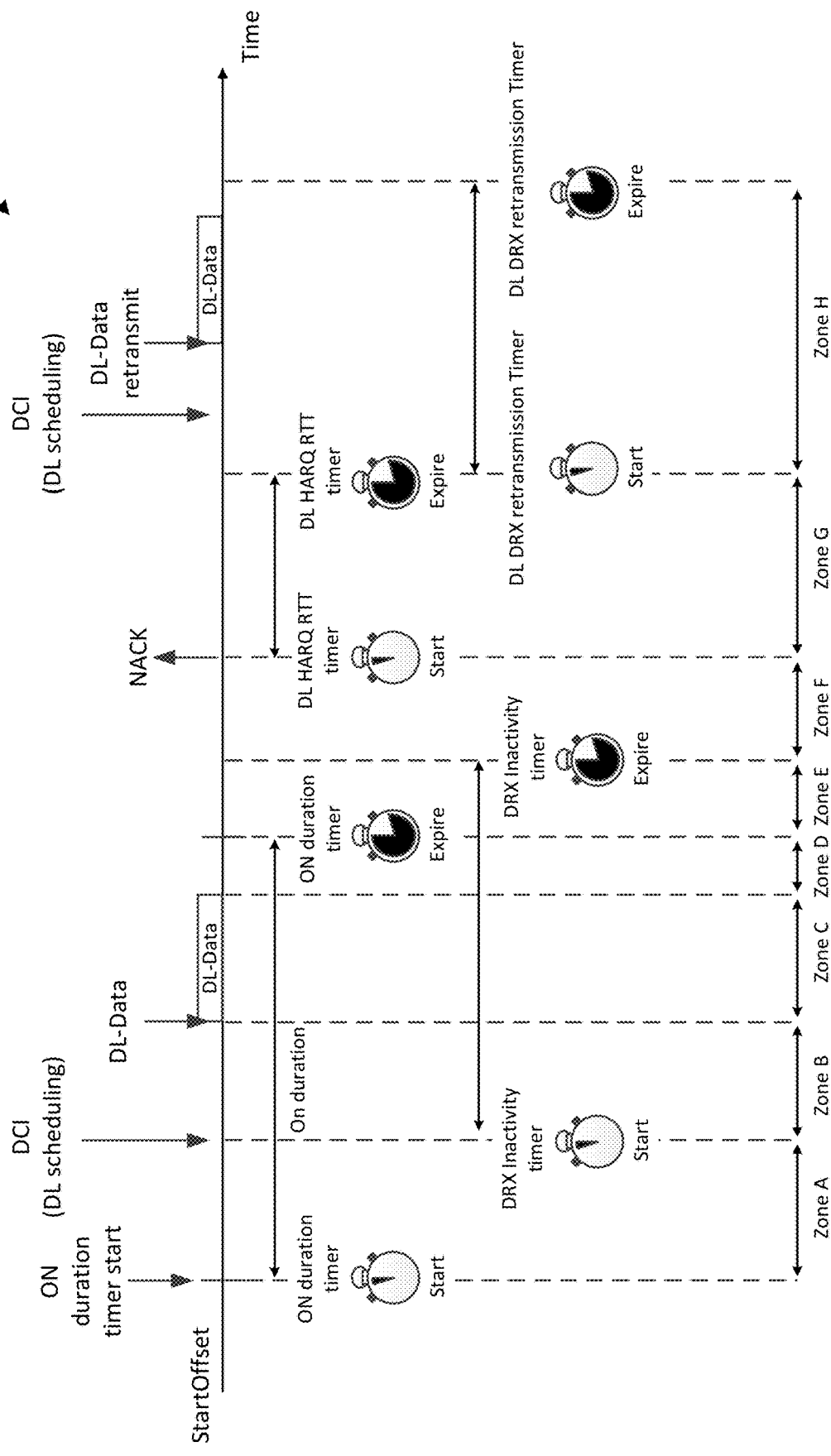
FIG. 6A a schematic diagram illustrating BWP switching within each time intervals for DL transmission, according to example implementations of the present application.

FIG. 6A illustrates a case where a base station indicates a DL data reception within an active BWP, according to an example implementation of the present application. In the present implementation, the base station performs data retransmission after receiving the UE's HARQ feedback for the assigned DL data reception.

Figure 6B:
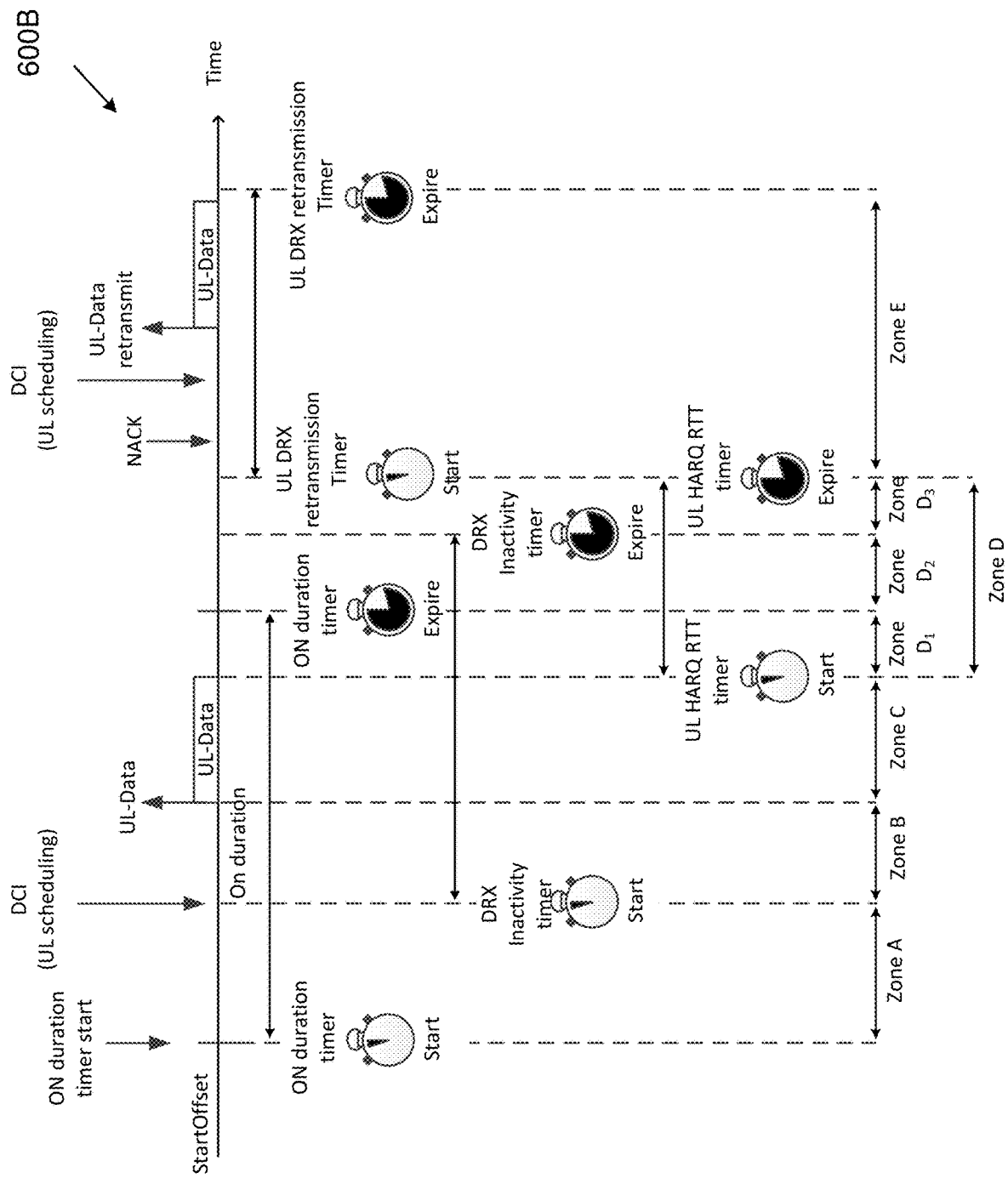
FIG. 6B a schematic diagram illustrating BWP switching within each time intervals for UL transmission, according to example implementations of the present application.

FIG. 6B illustrates a case where a base station indicates a UL data transmission within an active BWP, according to an example implementation of the present application. In this case, In the present implementation, the UE performs data retransmission after receiving the HARQ feedback from the base station for the assigned UL data transmission. In both DL and UL cases, the ON duration timer, DRX inactivity timer, HARQ RTT timer, and DRX retransmission timer are triggered accordingly.

The following describes the UE's actions/operations as results of BWP switching (e.g., from an active BWP (non-default) to default BWP) occurred within each time zone (time intervals) of the overall DRX operation for both DL and UL data transmissions. The time intervals for the DL and UL data transmissions are shown in FIG. 6A and FIG. 6B, respectively.

As shown in FIG. 6A, BWP switching may occur during DL data transmission within each of the time zones.

In diagram 600A, Zone A may begin when the ON duration timer starts, and end when the DRX Inactivity timer starts due to the DCI indicating DL data reception by the base station.

Zone B may begin when the DRX Inactivity timer starts, and end at the beginning of the scheduled DL data reception.

Zone C may begin from the beginning of the scheduled DL data reception, and end at the scheduled DL data reception.

Zone D may begin (in a case where the scheduled DL data reception is within ON duration) from the end of scheduled DL data reception, and end at the expiration of the ON duration timer.

Zone E may begin from the expiration of the ON duration timer, and end at the expiration of the DRX Inactivity timer.

Zone F may begin from the expiration of the DRX Inactivity timer, and end at the beginning of the DL HARQ RTT timer. Depending on the configuration of the DRX Inactivity timer, Zone F may conditionally exist.

Zone G may begin from the beginning of the DL HARQ RTT timer, and end at the expiration of the DL HARQ RTT timer. Depending on the base station's scheduling, Zone G may conditionally overlap with the time interval during the ON duration timer and/or DRX Inactivity timer is running.

Zone H may begin from the beginning of the DL DRX retransmission timer, and end at the expiration of the DL retransmission timer.

For BWP switching triggered by the expiration of the BWP Inactivity timer, the UE's reactions within each zone are described below.

In Zone A, the UE switches to the new BWP, and keeps the ON duration timer running.

In Zone B, the base station schedules a data for reception earlier than the BWP inactivity timer expired, since the BWP inactivity timer is restarted once the UE receives a DCI indicating new data reception. Even if it happens, the UE aborts this data reception and the corresponding HARQ feedback for the data reception. In another implementation, the UE postpones the BWP switching till after the scheduled data reception, and performs corresponding HARQ feedback in the new BWP. In some other implementations, the UE switches back to the default BWP after the BWP inactivity timer expires, and switches back to the BWP for receiving the scheduled data at the time of the scheduled data reception. After the data reception, the UE stays at the BWP and performs corresponding HARQ feedback. In some other implementations, the UE postpones the BWP switching till after the scheduled data reception and the corresponding HARQ feedback are finished. In some implementations, the UE postpones the BWP switching till after the scheduled data reception and the corresponding HARQ feedback are finished (only if the HARQ feedback is ACK/NACK). If the UE aborts this scheduled data reception, the DRX inactivity timer may also be skipped (stopped).

In Zone C, the base station schedules a data for reception finished earlier than the BWP inactivity timer expired since the BWP inactivity timer is restarted once the UE receives a DCI indicating new data reception. Even if it happens, the UE may either abort this data reception or postpone the BWP switching till after the scheduled data reception is finished. In some other implementations, the UE postpones the BWP switching till after the scheduled data reception is finished and the corresponding HARQ feedback is finished. In some other implementations, the UE postpones the BWP switching till after the scheduled data reception and the corresponding HARQ feedback are finished (only if the HARQ feedback is ACK/NACK). If the UE aborts the scheduled data reception, the DRX inactivity timer may either keep running or stopped.

In Zone D, the UE switches the BWP immediately and keeps both the DRX inactivity timer and the ON duration timer running. In addition, the DRX inactivity timer and the ON duration timer can either keep running or stopped after switching to new BWP. In some implementations, the ON duration timer keep running but stop the DRX inactivity timer after switching to new BWP. In some other implementations, the UE postpones the BWP switching till after the ON duration timer expires. In another implementation, the UE postpones the BWP switching till after the DRX inactivity timer expires. In yet another implementation, the UE postpones the BWP switching till after finishing corresponding HARQ feedback. In yet another implementation, the UE postpones the BWP switching till after finishing corresponding HARQ feedback (only if the HARQ feedback is ACK/NACK). If the UE switches the BWP immediately, the UE may abort corresponding HARQ feedback in original BWP and new BWP. In yet another implementation, the UE postpones the BWP switching till after a predetermined number of rounds of the corresponding HARQ process is finished.

In Zone E, the UE switches the BWP immediately and keeps the DRX inactivity timer running. In addition, the DRX inactivity timer may either keep running or be stopped after switching to the new BWP. In another implementation, the UE postpones the BWP switching till after the DRX inactivity timer expires. In yet another implementation, the UE postpones the BWP switching till after the corresponding HARQ feedback is finished. In some implementations, the UE postpones the BWP switching till after the corresponding HARQ feedback is finished (only if the HARQ feedback is ACK/NACK). If the UE switches the BWP immediately, the UE may abort the corresponding HARQ feedback in both the original BWP and the new BWP. In some other implementations, the UE postpones the BWP switching till after a predetermined number of rounds of the corresponding HARQ process is finished.

In Zone F, the UE switches the BWP immediately. In one implementation, the UE postpones the BWP switching till after the corresponding HARQ feedback is finished. In another implementation, the UE postpones the BWP switching till after the corresponding HARQ feedback is finished (only if the HARQ feedback is ACK/NACK). If the UE switches the BWP immediately, the UE may abort the correspond HARQ feedback in both the original BWP and the new BWP. If the UE switches the BWP immediately, the UE keeps the DRX operation (e.g., DRX off if any of on duration timer, DRX inactivity timer or DRX retransmission timer is not triggered). In yet another implementation, the UE postpones the BWP switching till after a predetermined number of rounds of the corresponding HARQ process is finished.

In Zone G, the UE switches the BWP immediately. In another implementation, the UE postpones the BWP switching till after all corresponding HARQ processes are finished. In another implementation, the UE postpones the BWP switching till after a predetermined number of rounds of the corresponding HARQ process is finished. If the UE switches the BWP immediately, the UE keeps the HARQ process (e.g., keeps HARQ related retransmission counter(s)) or aborts the corresponding data re-reception in the original BWP and new BWP, and stops the running DL HARQ RTT timer. If the UE switches the BWP immediately, the UE keeps the DRX operation (e.g., DRX off if any of on duration timer, DRX inactivity timer or DRX retransmission timer is not triggered). However, in a case where Zone G overlaps with the time interval during both the ON duration timer and the DRX Inactivity timer are running, the treatments to the ON duration timer and DRX Inactivity timer are the same as the description in Zone D. In another implementation, in a case that the Zone G overlaps with the time interval during the DRX Inactivity timer is running, the treatments to the ON duration timer and DRX Inactivity timer are the same as the description in Zone E.

In Zone H, the UE switches the BWP immediately. In another implementation, the UE postpones the BWP switching till after all corresponding HARQ processes are finished. In yet another implementation, the UE postpones the BWP switching till after a predetermined number of rounds of the corresponding HARQ process is finished. If the UE switches the BWP immediately, the UE keeps the HARQ process (e.g., keeps the HARQ related retransmission counter(s)) or aborts the corresponding data re-reception in the original BWP and the new BWP, and stops the running DL DRX retransmission timer. If the UE switches the BWP immediately, the UE keeps the DRX operation (e.g., DRX off if any of on duration timer, DRX inactivity timer or DRX retransmission timer is not triggered).

In some implementations, for example, in zones B, D and E above, the UE receives a DCI indicating a PDSCH reception on a DL BWP while the UE has an active UL BWP at that timing, if the UL BWP is switched before the corresponding HARQ feedback of the PDSCH transmission, then the UE does not expect to transmit the HARQ feedback information. It is noted that, the HARQ feedback has two interpretations: positive acknowledgment (ACK) and negative acknowledgment (NACK). Wherein the HARQ feedback within the NR is represented as a HARQ-ACK information bit, and the HARQ-ACK information bit value of 0 represents a NACK while a HARQ-ACK information bit value of 1 represents a ACK.

For BWP switching triggered by DCI indication, the UE's reactions within each zone also have same positions described in BWP switching triggered by BWP Inactivity timer expiration case. The difference is that the UE may be explicitly or implicitly indicated to take one of the positions by DCI.

As shown in diagram 600B of FIG. 6B, BWP switching may occur during UL data transmission within each of the time zones.

Zone A may begin when the ON duration timer starts, and end when the DRX Inactivity timer starts due to the DCI indicating UL data reception by the base station.

Zone B may begin when the DRX Inactivity timer starts, and end at the beginning of the scheduled UL data transmission.

Zone C may begin from the beginning of the scheduled UL data transmission, and end at the scheduled UL data transmission.

Zone D may begin from the beginning of the UL HARQ RTT timer, and end at the expiration of the UL HARQ RTT timer. It is noted that, due to the configuration of the DRX Inactivity timer, there are three possible sub-zones (e.g., Zones $D_1$, $D_2$ and $D_3$) within Zone D.

In Zone $D_1$, the time interval, during which the ON duration timer, DRX Inactivity timer and the UL HARQ RTT timer are all running, begins from the beginning of the UL HARQ RTT timer and ends at the expiration of the ON duration timer.

In Zone $D_2$, the time interval, during which both the DRX Inactivity timer and the UL HARQ RTT timer are running, begins from the expiration of the ON duration timer, and ends at the expiration of the DRX Inactivity timer.

In Zone $D_3$, the time interval, during which only the UL HARQ RTT timer is running, begins from at the expiration of the DRX Inactivity timer, and ends at expiration of the UL HARQ RTT timer.

Zone E may begin from the expiration of the ON duration timer, and end at the expiration of the DRX Inactivity timer.

Zone F may begin from the expiration of the DRX Inactivity timer, and end at the expiration of the UL HARQ RTT timer (beginning of UL DRX retransmission timer).

Zone G may begin from the beginning of the UL DRX retransmission timer, and end at the expiration of the UL DRX retransmission timer.

For BWP switching triggered by the expiration of the BWP Inactivity timer, the UE's reactions within each zone are described below.

In Zone A, the UE switches to the new BWP, and keeps the ON duration timer running.

In Zone B, the base station schedules a data for transmission earlier than the BWP inactivity timer expired since the BWP inactivity timer is restarted once the UE receives a DCI indicating new data transmission. Even if it happens, the UE can either abort this data transmission or postpone the BWP switching till after the scheduled data transmission. In another implementation, the UE postpones the BWP switching till after the scheduled data transmission is finished and the corresponding HARQ reception is finished. In yet another implementation, UE postpones the BWP switching till after the scheduled data transmission is finished and the corresponding HARQ reception is finished (only if the HARQ reception is ACK/NACK). If the UE aborts this scheduled data transmission, the DRX inactivity timer may also be skipped (stopped).

In Zone C, the base station schedules a data for transmission finished earlier than the BWP inactivity timer expired since the BWP inactivity timer is restarted once the UE receives a DCI indicating new data transmission. Even if it happens, the UE may either abort this data transmission or postpone the BWP switching after the scheduled data reception is finished. In another implementation, the UE postpones the BWP switching till after the scheduled data transmission is finished and the corresponding HARQ reception is finished. In yet another implementation, the UE postpones the BWP switching till after the scheduled data transmission is finished and the corresponding HARQ reception is finished (only if the HARQ reception is ACK/NACK). If the UE aborts this scheduled data transmission, the DRX inactivity timer may either keep running or stop.

In Zone $D_1$, the UE switches the BWP immediately and keeps all of the DRX inactivity timer, the ON duration timer and the UL RTT timer running. In addition, the DRX inactivity timer, the ON duration timer and the UL RTT timer may either keep running or stop after switching to the new BWP. In another implementation, the DRX inactivity timer and the ON duration timer may keep running, but the UL RTT timer may be stopped after switching to the new BWP. In yet another implementation, the UE postpones the BWP switching till after the ON duration timer expires. In yet another implementation, the UE postpones the BWP switching till after the DRX inactivity timer expires. In some implementations, the UE postpones the BWP switching till after the corresponding HARQ reception is finished. In some other implementations, UE postpones the BWP switching till after the corresponding HARQ reception is finished (only if the HARQ reception is ACK/NACK). If the UE switches the BWP immediately, the UE may abort the corresponding HARQ reception in both the original BWP and the new BWP. In yet another implementation, the UE postpones the BWP switching till after a predetermined number of rounds of the corresponding HARQ process is finished.

In Zone $D_2$, the UE switches the BWP immediately and keeps both the DRX inactivity timer and the UL HARQ RTT timer running. In addition, the DRX inactivity timer and the UL HARQ RTT timer may either keep running or stop after the UE switching to the new BWP. In another implementation, the DRX inactivity timer keeps running but the UL HARQ RTT timer stops. In yet another implementation, the UE postpones the BWP switching till after the DRX inactivity timer expires. In yet another implementation, the UE postpones the BWP switching till after finishing the corresponding HARQ reception. In some implementations, the UE postpones the BWP switching till after the corresponding HARQ reception is finished (only if the HARQ reception is ACK/NACK). If the UE switches the BWP immediately, the UE may abort the corresponding HARQ reception in the original BWP and the new BWP, and the UL DRX retransmission will not be triggered. In some other implementations, the UE postpones the BWP switching till after finishing a predetermined number of rounds of corresponding HARQ process.

In Zone $D_3$, the UE switches the BWP immediately. In another implementation, the UE postpones the BWP switching till after the corresponding HARQ reception is finished. In yet another implementation, the UE postpones the BWP switching after finishing the corresponding HARQ reception (only if the HARQ feedback is ACK/NACK). If the UE switches the BWP immediately, the UE may abort the corresponding HARQ reception in the original BWP and the new BWP, and the UL DRX retransmission will not be triggered. If the UE switches the BWP immediately, the UE keeps DRX operation (e.g., DRX off if any of on duration timer, DRX inactivity timer or DRX retransmission timer is not triggered). In some implementations, the UE postpones the BWP switching till after a predetermined number of rounds of corresponding HARQ process is finished.

In Zone E, the UE switches the BWP immediately. In some implementations, the UE postpones the BWP switching till after all corresponding HARQ process are finished. In some other implementations, the UE postpones the BWP switching till after a predetermined number of rounds of corresponding HARQ process is finished. If the UE switches the BWP immediately, the UE keeps the HARQ process (e.g., keeps HARQ related retransmission counter) or aborts the corresponding data re-transmission in the original BWP and the new BWP, and stops the running UL DRX retransmission timer. If the UE switches the BWP immediately, the UE keeps the DRX operation (e.g., DRX off if any of on duration timer, DRX inactivity timer or DRX retransmission timer is not triggered).

For BWP switching triggered by DCI indication, the UE's reactions within each zone may have the same positions described in BWP switching triggered by BWP Inactivity timer expiration case. The differences may include that the UE may be explicitly or implicitly indicated to take one of the positions by DCI.

Regarding to the UE switches to a new BWP, within all of the zones, for example, a UE switches from BWP 1 (SCS=120 KHz, Normal CP, $1/112$ ms symbol length) to BWP 2 (SCS=30 KHz, Normal CP, $1/28$ ms symbol length). The UE may keep counting all of the ongoing timers (any DRX timers (e.g., on duration timer, DRX inactivity timer, HARQ RTT timer and DRX retransmission timer)), and thus the behavior has several options. For example, the UE may keep the drx-HARQ-RTT-TimerDL running without interruption, when BWP switching occurs. Also, when BWP switching occurs, the UE may updating the drx-HARQ-RTT-TimerDL after the drx-HARQ-RTT-TimerDL is stopped or expires.

In some implementations, for example, in zones B, D and E above, the UE does not expect to transmit HARQ-ACK information if the UE changes its active UL BWP on the PCell between a time of a detection of the DCI and a time of a corresponding HARQ-ACK information transmission on the PUCCH.

There are two options for a timer (any DRX timers, (e.g., on duration timer, DRX inactivity timer, HARQ RTT timer and DRX retransmission timer)) to be configured with absolute time.

If the UE switches to a new BWP, the UE may keep counting all of the ongoing timers. However, the UE may change the timers counting basis to the configuration on the new BWP.

Option 1: After the UE is switched to BWP 2, the UE keeps the timer counting in real time, and the UE doesn't care about whether the symbol or slot length has changed or not. Once the timer expires within a middle of a symbol and/or slot, the UE extends the expiration time to the end of current symbol and/or slot.

Option 2: In this case, once the timer expires in the middle of a symbol and/or slot, the UE allows the timer to expire at end of last complete symbol and/or slot in advance, if the expected expiration time of the timer is within the middle of a symbol and/or slot.

There are three options for any DRX timers (e.g., on duration timer, DRX inactivity timer, HARQ RTT timer and DRX retransmission timer) to be configured with STU or STU but presented in ms.

Option 1: The timer is counting the number of the STU ($1/112$ ms, which is the symbol length in BWP 1), and then after switching to BWP 2, the UE keeps counting the number of steps but changes the step into the configuration of BWP 2 ($1/28$ ms, which is the symbol length in BWP 2). In one implementation, the symbol can be replaced by slot or UE specific coreset period. Once the switching time is within a middle of a STU of BWP2, the UE also counts the STU.

Option 2: Once the switching time is within the middle of a STU of BWP 2, the UE counts the proportional of the STU.

Option 3: Once the switching time is within a middle of a STU of BWP2, the UE ignores the counting of the STU.

Case 5: Exceptional Cases

Figure 7A:
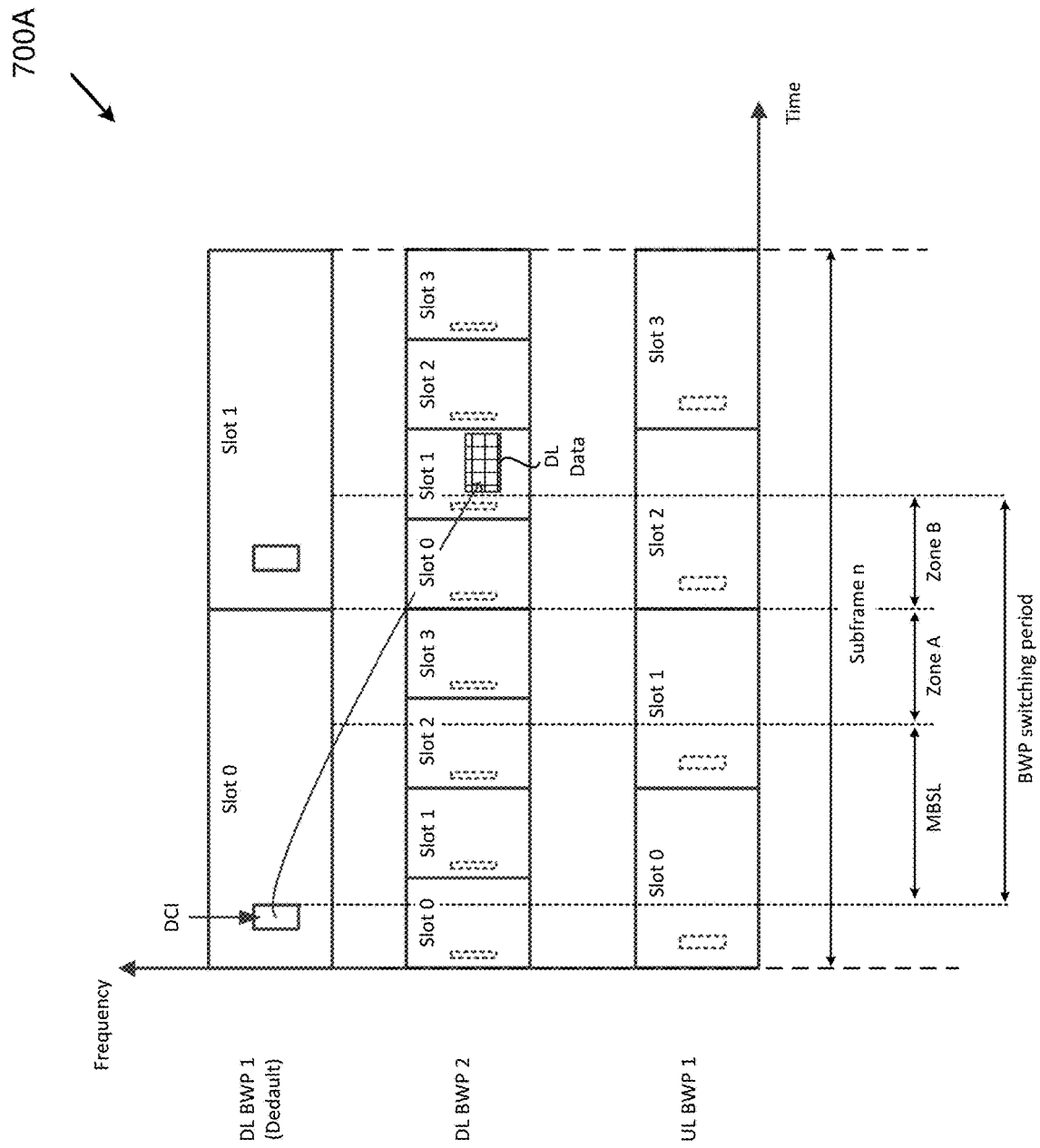
FIG. 7A a schematic diagram illustrating the slot length of a default BWP being longer than the slot length of a non-default BWP scheduled by the base station for data reception, according to example implementations of the present application.

A base station transmits a DCI in the default BWP to schedule a DL data reception in another DL BWP. As shown in FIG. 7A, the slot length of the default BWP is longer than the slot length of DL BWP2 scheduled by the base station for data reception.

As shown in FIG. 7A, the base station is not to schedule data reception/transmission within the slot(s) (e.g., slot 0 to slot 3 of DL BWP 2) in another BWP within the slot interval (slot 0 of DL BWP 1) in which the DCI is transmitted.

In another implementation, the UE follows a maximum BWP switching latency (MBSL) requirement to finish the BWP switching. The MBSL may be a UE capability report to the base station. In another implementation, the MBSL is configured by the base station, but the MBSL's determination may also take the UE's capability into consideration. There are two different zones, which can be configured to schedule data or not allow to schedule data (the UE doesn't need to monitor PDCCH). As illustrated in diagram 700A of FIG. 7A, there are two zones: zone A and zone B. Zone A starts from the end of the maximum BWP switching latency is reached, and ends at the slot which transmits the DCI.

Zone B starts from the end of zone A and ends at the start of the scheduled data reception.

In another implementation, zone B can be divided into several sub zones. For example, the time interval starts from the end of zone A and ends at the start of the slot of the scheduled data reception or at the start of the CORESET of the slot of the scheduled data reception.

Figure 7B:
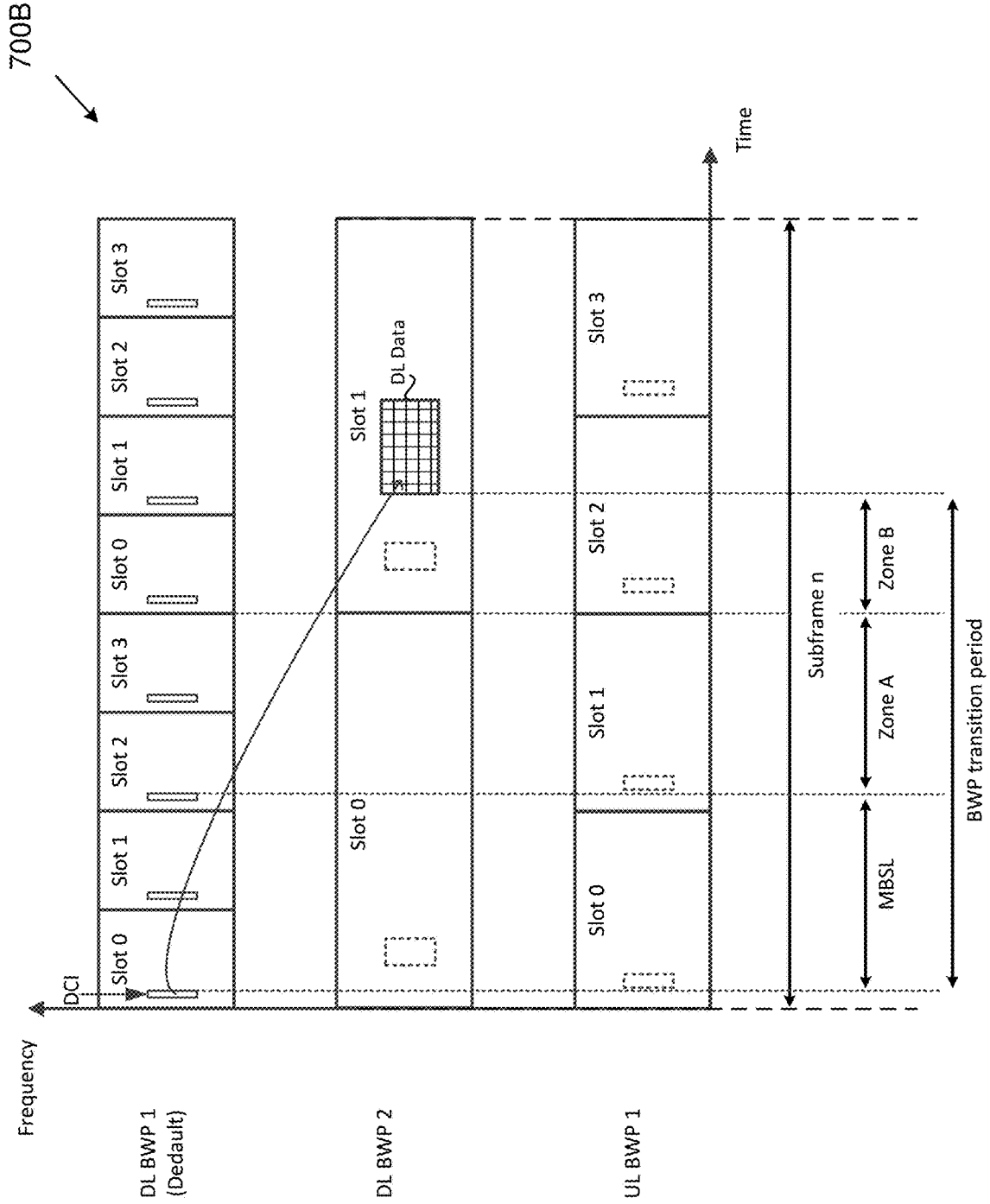
FIG. 7B a schematic diagram illustrating the slot length of a default BWP being shorter than the slot length of a non-default BWP scheduled by the base station for data reception, according to example implementations of the present application.

As shown in FIG. 7B, the slot length of the default BWP is shorter than the slot length of DL BWP 2 scheduled by the base station for data reception.

As shown in diagram 700B of FIG. 7B, the base station is not to schedule data reception/transmission within the slot(s) (e.g., slot 0 of DL BWP 2) in another BWP within the slot interval (slot 0 of DL BWP 1) in which the DCI is transmitted. In another implementation, the base station is not to schedule data reception/transmission within the time interval in another BWP (DL BWP 2), where the time interval is aligned with the slot in which the DCI is transmitted (slot 0 of DL BWP 1).

In another implementation, the UE follows a requirement (e.g., MBSL requirement) to finish the BWP switching. The MBSL may be a UE capability report to the base station. In yet another implementation, the MBSL is configured by the base station, but the MBSL's determination may also take the UE's capability into consideration. There are two different zones, which can be configured to schedule data or not allow to schedule data (the UE doesn't need to monitor PDCCH). As illustrated in FIG. 7B, there are two zones: zone A and zone B. Zone A starts from the end of maximum BWP switching latency is reached, and ends at starts of the slot which schedules the data reception. Zone B starts from the end of zone A and end at the start of the scheduled data reception.

In another implementation, zone B can be divided into several sub zones. For example, the time interval starts from the end of zone A and ends at the start of the slot of the scheduled data reception or at the start of the CORESET of the slot of the scheduled data reception.

It is noted that the MBSL for DL and UL may be different.

In various implementations of the present application, the active time within a DRX operation may be the time related to DRX operation during which the MAC entity monitors the PDCCH and UE-specific control resource set. When a DRX cycle is configured, the active time includes the time while: the ON duration Timer or DRX inactivity Timer or DRX DL retransmission Timer or DRX UL retransmission Timer is running for any BWP on any active cell per RRC entity; or during the active time, the UE monitors the PDCCH and the UE-specific control resource set within any active band width part on each active cell.

Figure 8:
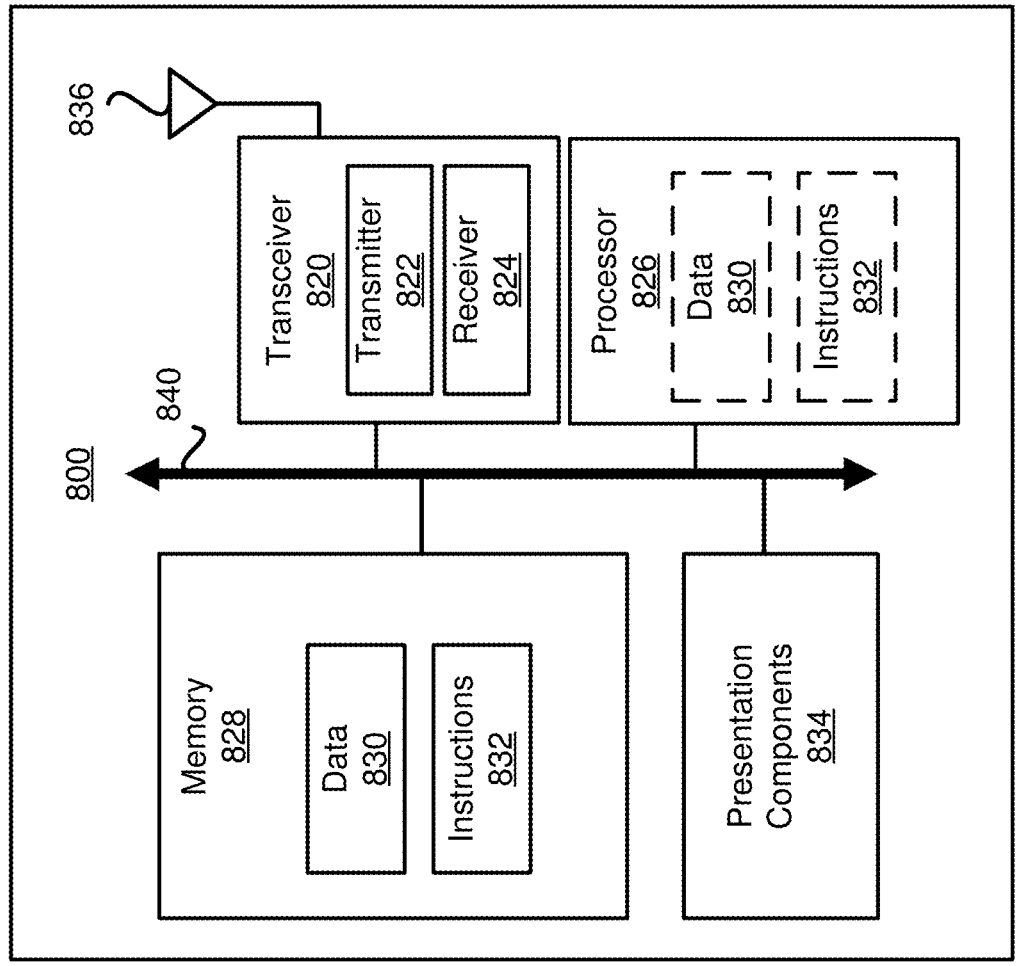
FIG. 8 is a block diagram illustrating a node for wireless communication, in accordance with an example implementation of the present application.

FIG. 8 illustrates a block diagram of a node for wireless communication, in accordance with various aspects of the present application. As shown in FIG. 8, a node 800 may include a transceiver 820, a processor 826, a memory 828, one or more presentation components 834, and at least one antenna 836. The node 800 may also include an RF spectrum band module, a base station communications module, a network communications module, and a system communications management module, input/output (I/O) ports, I/O components, and power supply (not explicitly shown in FIG. 8). Each of these components may be in communication with each other, directly or indirectly, over one or more buses 840. In one implementation, the node 800 may be a UE or a base station that performs various functions described herein, for example, with reference to FIGS. 1 through 7B.

The transceiver 820 having a transmitter 822 (having transmitting circuitry) and a receiver 824 (having receiving circuitry) may be configured to transmit and/or receive time and/or frequency resource partitioning information. In some implementations, the transceiver 820 may be configured to transmit in different types of subframes and slots including, but not limited to, usable, non-usable and flexibly usable subframes and slot formats. The transceiver 820 may be configured to receive data and control channels.

The node 800 may include a variety of computer-readable media. Computer-readable media can be any available media that can be accessed by the node 800 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 828 may include computer-storage media in the form of volatile and/or non-volatile memory. The memory 828 may be removable, non-removable, or a combination thereof. Exemplary memory includes solid-state memory, hard drives, optical-disc drives, and etc. As illustrated in FIG. 8, The memory 828 may store computer-readable, computer-executable instructions 832 (e.g., software codes) that are configured to, when executed, cause the processor 826 (e.g., processing circuitry) to perform various functions described herein, for example, with reference to FIGS. 1 through 7B. Alternatively, the instructions 832 may not be directly executable by the processor 826 but be configured to cause the node 800 (e.g., when compiled and executed) to perform various functions described herein.

The processor 826 may include an intelligent hardware device, e.g., a central processing unit (CPU), a microcontroller, an ASIC, and etc. The processor 826 may include memory. The processor 826 may process the data 830 and the instructions 832 received from the memory 828, and information through the transceiver 820, the base band communications module, and/or the network communications module. The processor 826 may also process information to be sent to the transceiver 820 for transmission through the antenna 836, to the network communications module for transmission to a core network.

One or more presentation components 834 presents data indications to a person or other device. Exemplary presentation components 834 include a display device, speaker, printing component, vibrating component, and etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE) for discontinuous reception (DRX) operation having a Downlink DRX Hybrid Automatic Repeat reQuest (HARQ) Round-Trip Time Timer (drx-HARQ-RTT-TimerDL), the UE comprising:
   one or more non-transitory computer-readable media having computer-executable instructions embodied thereon; and
   at least one processor coupled to the one or more non-transitory computer-readable media, and configured to execute the computer-executable instructions to perform the DRX operation, wherein the DRX operation comprises:
      receiving a downlink (DL) data on a DL bandwidth part (BWP);
      performing an uplink (UL) transmission carrying a DL HARQ feedback corresponding to the DL data on a UL BWP; and
      starting the drx-HARQ-RTT-TimerDL in a first symbol of a plurality of symbols of the DL BWP immediately after an end of the UL transmission, wherein:
      each symbol in the plurality of symbols comprises a scalable time unit having a length that is a variable fraction of a fixed time unit, and
      the drx-HARQ-RTT-TimerDL starts running from an initial value that is represented in a number of symbols of the DL BWP.

2. The UE of claim 1, wherein a symbol length of at least one of the number of symbols is determined by a subcarrier spacing (SCS) of the DL BWP.

3. The UE of claim 1, wherein the drx-HARQ-RTT-TimerDL is a timer configured by a base station to the UE to specify when to start an active time period during which the UE is to monitor a Physical Downlink Control CHannel (PDCCH).

4. The UE of claim 1, wherein the drx-HARQ-RTT-TimerDL starts running from the initial value towards zero or before being stopped.

5. A method for discontinuous reception (DRX) operation having a Downlink DRX Hybrid Automatic Repeat reQuest (HARQ) Round-Trip Time Timer (drx-HARQ-RTT-TimerDL) for a user equipment (UE), the method comprising:
   receiving, by reception circuitry of the UE, a downlink (DL) data on a DL bandwidth part (BWP);
   performing, by transmission circuitry of the UE, an uplink (UL) transmission carrying a DL HARQ feedback corresponding to the DL data on a UL BWP; and
   starting, by a processor of the UE, the drx-HARQ-RTT-TimerDL in a first symbol of a plurality of symbols of the DL BWP immediately after an end of the UL transmission, wherein:
   each symbol in the plurality of symbols comprises a scalable time unit having a length that is a variable fraction of a fixed time unit, and
   the drx-HARQ-RTT-TimerDL starts running from an initial value that is represented in a number of symbols of the DL BWP.

6. The method of claim 5, wherein a symbol length of at least one of the number of symbols is determined by a subcarrier spacing (SCS) of the DL BWP.

7. The method of claim 5, wherein the drx-HARQ-RTT-TimerDL is a timer configured by a base station to the UE to specify when to start an active time period during which the UE is to monitor a Physical Downlink Control CHannel (PDCCH).

8. The method of claim 5, wherein the drx-HARQ-RTT-TimerDL starts running from the initial value towards zero or before being stopped.

* * * * *